US010460376B1

(12) United States Patent
Krakowiecki et al.

(10) Patent No.: US 10,460,376 B1
(45) Date of Patent: Oct. 29, 2019

(54) SYSTEM AND METHOD FOR DATA MANAGEMENT AND FINANCIAL BUDGETING

(75) Inventors: Matthew Krakowiecki, Denver, CO (US); Pearl Kolling, Oakland, CA (US); Jack Mackouse, Walnut Creek, CA (US); Kevin Rhein, Minnetonka, MN (US); Elizabeth Hoople, Walnut Creek, CA (US); Kathy Yee, Orinda, CA (US); Brian Paul McMahon, Berkely, CA (US); Brett David Ehrlich, San Carlos, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 264 days.

(21) Appl. No.: 12/324,637

(22) Filed: Nov. 26, 2008

Related U.S. Application Data

(60) Provisional application No. 60/990,903, filed on Nov. 28, 2007.

(51) Int. Cl.
*G06Q 40/00* (2012.01)

(52) U.S. Cl.
CPC .................... *G06Q 40/00* (2013.01)

(58) Field of Classification Search
CPC ...................................................... G06Q 40/00
(Continued)

(56) References Cited

U.S. PATENT DOCUMENTS

| 4,346,442 | A | 8/1982 | Musmanno |
| 4,376,978 | A | 3/1983 | Musmanno |

(Continued)

FOREIGN PATENT DOCUMENTS

| EP | 1081664 | 3/2001 |
| EP | 1107149 | 6/2001 |

(Continued)

OTHER PUBLICATIONS

Define: "link" as "A segment of text or a graphical item that serves as a cross-reference between parts of a webpage or other hypertext documents or between webpages or other hypertext documents." See The American Heritage Science Dictionary (2002) (attached).*

(Continued)

*Primary Examiner* — Peter Ludwig
(74) *Attorney, Agent, or Firm* — Foley & Lardner LLP

(57) ABSTRACT

A data management system includes a storage device configured to store financial data for a plurality of financial transactions, the financial data for the plurality of financial transactions being associated with a plurality of different accounts of a user, each of the plurality of financial transactions being associated with one of a plurality of transaction categories. The system further includes a server coupled to the storage device and configured to retrieve the financial data for the plurality of financial transactions from the data storage device; receive a request from the user to generate a budget for the user, the budget including budget cash flow amounts for the plurality of transaction categories, determine an average cash flow amount for each of the plurality of transaction categories, the average cash flow amount for each of the transaction categories being based on the financial data for financial transactions associated with the transaction category, generate a budget report including the budget cash flow amount for each of the plurality of transaction categories, the budget cash flow amount for each transaction category being determined based on the average cash flow amount for the transaction category, and provide the budget report to the user.

20 Claims, 20 Drawing Sheets

(58) Field of Classification Search
USPC .......................................................... 705/30
See application file for complete search history.

(56) References Cited

U.S. PATENT DOCUMENTS

| | | | |
|---|---|---|---|
| 4,597,046 | A | 6/1986 | Musmanno et al. |
| 4,774,662 | A | 9/1988 | Musmanno et al. |
| 5,193,055 | A | 3/1993 | Brown et al. |
| 5,710,889 | A | 1/1998 | Clark et al. |
| 5,826,243 | A | 10/1998 | Musmanno et al. |
| 5,890,140 | A | 3/1999 | Clark et al. |
| 5,933,816 | A | 8/1999 | Zeanah et al. |
| 5,940,809 | A | 8/1999 | Musmanno et al. |
| 6,058,378 | A | 5/2000 | Clark et al. |
| 6,073,119 | A | 6/2000 | Bornemisza-Wahr et al. |
| 6,173,270 | B1 | 1/2001 | Cristofich et al. |
| 6,324,523 | B1 | 11/2001 | Killeen, Jr. et al. |
| 6,332,126 | B1 | 12/2001 | Peirce et al. |
| 6,341,353 | B1 | 1/2002 | Herman et al. |
| 6,349,290 | B1 | 2/2002 | Horowitz et al. |
| 6,385,652 | B1 | 5/2002 | Brown et al. |
| 6,430,542 | B1 | 8/2002 | Moran |
| 6,697,824 | B1 | 2/2004 | Bowman-Amuah |
| 7,451,134 | B2 | 11/2008 | Krakowiecki |
| 2001/0011242 | A1* | 8/2001 | Allex et al. ................. 705/36 |
| 2002/0091635 | A1 | 7/2002 | Dilip et al. |
| 2002/0095651 | A1* | 7/2002 | Kumar et al. ............... 717/104 |
| 2002/0174006 | A1* | 11/2002 | Rugge et al. ................ 705/10 |
| 2002/0198806 | A1 | 12/2002 | Blagg et al. |
| 2003/0004751 | A1 | 1/2003 | Ng et al. |
| 2003/0009402 | A1* | 1/2003 | Mullen et al. .............. 705/35 |
| 2003/0018550 | A1 | 1/2003 | Rotman et al. |
| 2003/0033211 | A1* | 2/2003 | Haines et al. ............... 705/26 |
| 2003/0061132 | A1 | 3/2003 | Yu et al. |
| 2003/0097331 | A1 | 5/2003 | Cohen |
| 2003/0101131 | A1 | 5/2003 | Warren et al. |
| 2004/0153335 | A1* | 8/2004 | O'Keeffe ...................... 705/1 |
| 2005/0240526 | A1 | 10/2005 | Hill |
| 2006/0247987 | A1* | 11/2006 | Busch et al. ................. 705/30 |
| 2006/0253329 | A1* | 11/2006 | Haines et al. ............... 705/14 |
| 2007/0226074 | A1* | 9/2007 | Haines et al. ............... 705/26 |
| 2008/0027775 | A1* | 1/2008 | Ellis et al. .................... 705/8 |
| 2008/0033876 | A1* | 2/2008 | Goldman et al. ........... 705/42 |
| 2011/0004514 | A1* | 1/2011 | Thomas ..................... 705/14.17 |
| 2011/0004546 | A1* | 1/2011 | Thomas ...................... 705/39 |

FOREIGN PATENT DOCUMENTS

| | | |
|---|---|---|
| EP | 1143362 | 10/2001 |
| WO | 02/099576 | 12/2002 |

OTHER PUBLICATIONS

U.S. Appl. No. 12/324,581, filed Nov. 26, 2008, Krakowiecki et al.
U.S. Appl. No. 12/268,044, filed Nov. 10, 2008, Krakowiecki et al.
Gaizauskas, et al. Coupling Information Retrieval and Information Extraction: A New Text Technology for Gathering Information from the Web. 1997. Proceedings of RIAO 97: computer-Assisted Information Searching on the Internet. Montreal, Canada.
http://www.wellsfargo.com Account Management.
http:///web.intuit.com/support/quicken/2000/mac/2226.html. Reconciling Online Bank Accounts.
http://www.fremontbank.com/personal_banking/pam/pam.htm. Personal Account Manager.

* cited by examiner

| WELLS FARGO | |
|---|---|

| Account Summary |
|---|
| Brokerage |
| Bill Pay |
| Transfer |
| Account Services |
| My Message Center |

Ready to invest?
Call Wells Fargo Investments.
LEARN MORE

Get a Wells Fargo Student Loan
Rates have never been lower-starting at 2.77%
Learn More Home | Help Center | Contact Us | Locations | Site Map | Apply | Sign Off

Account Summary — 610

Last Log On: July 13, 2004

| Wells Fargo Accounts | OneLook Accounts |

Enroll for Online Statements | Check Out More New Features

My Message Center

Cash Accounts

| Account | Account Number | Available Balance |
|---|---|---|
| CHECKING | 002-4001xxx | $5,000.00 |
| CHECKING | 002-4002xxx | $5,000.00 |
| NAT TF MMA -Not FDIC Insured-No Bank Gaurantee-May Lose Value | 002-4005xxx | $6,000.00 |
| MRS | 002-4004xxx | $7,011.27 |
| SAVINGS | 002-4003xxx | $6,008.22 |
| Total | | $31,019.49 |

Investment Accounts

| Account | Account Number | Total Account Value |
|---|---|---|
| RETIREMENT TIME ACCOUNT | 002400xxx | $3,000.00 |
| TIME ACCOUNT | 002400xxx | $90,000.00 |
| BROKERAGE -Not FDIC Insured-No Bank Gaurantee-May Lose Value | W674xxx10 | $0.00 |
| Total | | $93,000.00 |

Credit Accounts — 611

| Account | Account Number | Outstanding Balance | Available Credit |
|---|---|---|---|
| HOME EQUITY LINE OF CREDIT | 071-3300xxx | $0.00 | $250,000.00 |
| MASTERCARD   View Spending Report | 5490-8401-0423-xxxx | $934.21 | $4,265.79 |
| ±SMARTFIT HOME EQUITY ACCOUNT | 076-3302xxx-1998 | $0.00 | $0.00 |
| ±SMARTFIT HOME EQUITY ACCOUNT | 076-3302xxx-1998 | $0.00 | $0.00 |
| Total | | $0.00 | $250,000.00 |

Loan Accounts

| Account | Account Number | Outstanding Principal Balance |
|---|---|---|
| PERSONAL LOAN SECURED | 002-3306xxx | $10,000.00 |
| MORTGAGE | 1078xxx | $62,170.42 |
| ±STUDENT LOAN | 37214xxx | $5,000.00 |

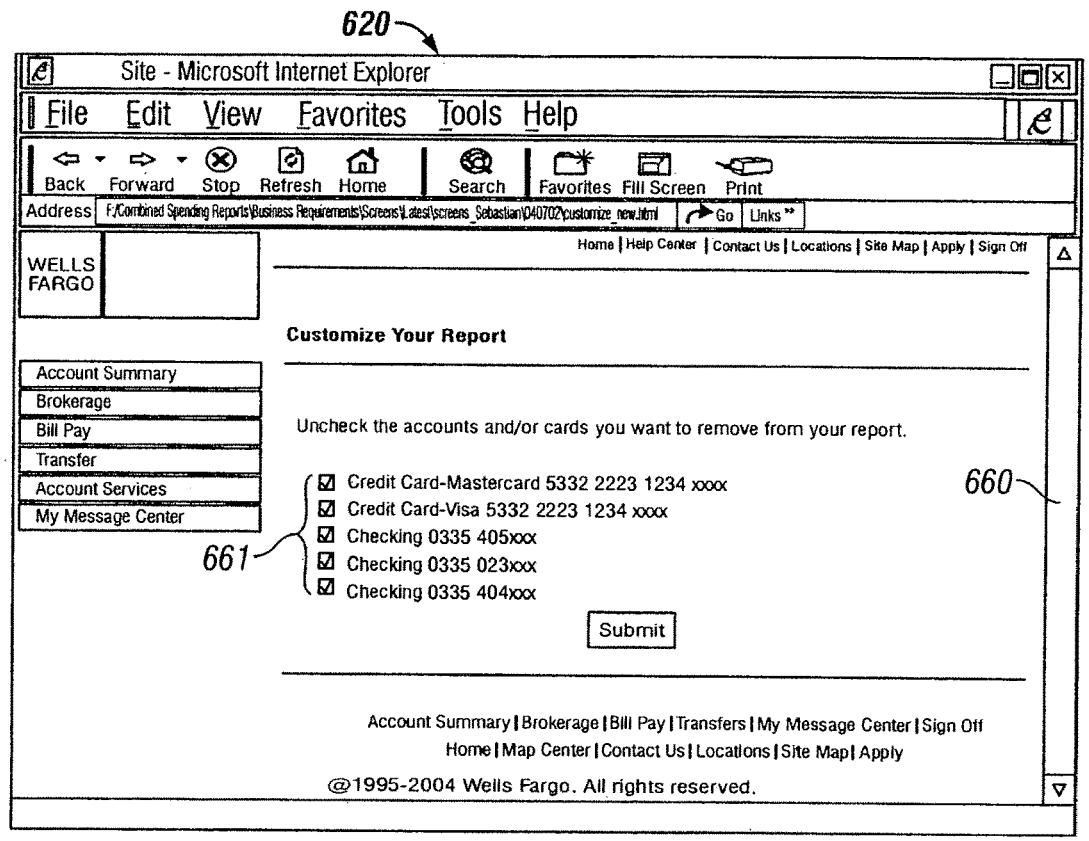
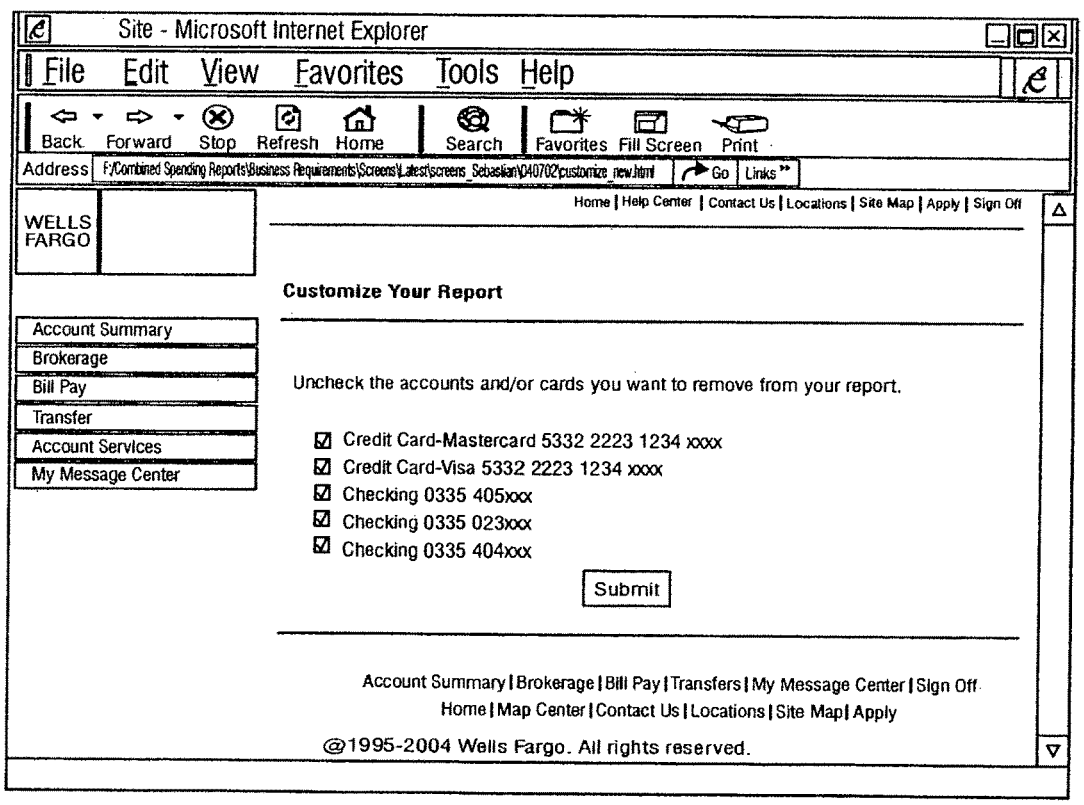
*FIG. 7C*

620

My Spending Report

| Spending Summary | Credit Cards | Check Cards | Other Checking Activity | Bill PAy |

Household / Services / Utilities - Check Cards
<Back to Previous Page
Click on column heading to sort

July 2004

| Posting Date | Location | Description | Eligible for Rewards? | Amount | Payment Method |
|---|---|---|---|---|---|
| 07/08/04 | ---- | CHECK CRD PURCHASE 08/22 OceanViewSA Luxembourg LU 432374XXXXXX5410 238404107116541 ?MCC=7995 091000019DA | YES | $40.00 | Krishna checking 322 322-8422xxx |
| 07/08/04 | ---- | CHECK CRD PURCHASE 08/23 OceanViewSA Luxembourg LU 432374XXXXXX7822 238404107116644 ?MCC=7995 091000019DA | YES | $50.00 | Krishna checking 322 322-8422xxx |
| 07/08/04 | ---- | CHECK CRD PURCHASE 08/24 FEDEX SHP 08/19/04 AB# 628-423641291 TN 491969XXXXX6001 238404103555216 ? MCC=7995 091000019DA | YES | $63.00 | Krishna checking 397 397-1065xxx |
| 07/08/04 | ---- | CHECK CRD PURCHASE 08/23 OceanViewSA Luxembourg LU 432374XXXXXX7822 238404107116637 ?MCC=7995 091000019DA | YES | $20.00 | Krishna checking 322 322-8422xxx |
| 07/08/04 | ---- | CHECK CRD PURCHASE 08/23 WWW.INEXIA.COM+ +DF 432374XXXXXX5410 238404107119538 ?MCC=7995 091000019DA | YES | $30.00 | Krishna checking 322 322-8422xxx |
| 07/08/04 | ---- | CHECK CRD PURCHASE 08/24 FEDEX SHP 08/19/04 AB# 628-423641291 TN 491969XXXXX6001 238404103555216 ? MCC=7995 091000019DA | YES | $18.00 | Krishna checking 397 397-1065xxx |
| 07/08/04 | ---- | CHECK CRD PURCHASE 08/24 GOOGLE *ADWORDS 650-623-4000 CA 432374XXXXX0541 239404105013203 ? MCC=7311 091000019DA | YES | $527.00 | Krishna checking 397 397-1065xxx |
| 07/08/04 | ---- | CHECK CRD PURCHASE 08/22 KANOODLE.COM, INC 716-6911758 NY 432374XXXXX0541 238404104618891 ? MCC=7311 091000019DA | YES | $100.00 | Krishna checking 397 397-1065xxx |
| Sub Total Household / Services / Utilities | | | | $649.95 | |

650, 650, 630

<Back to Previous Page

Print this page only or print all pages
Save as PDF this page only or save all pages.

Need more information about these features? Read our Frequently Asked Questions

1 You can earn rewards points on your purchases if you are enrolled in one of Wells Fargo's optional rewards programs for our Wells Fargo Check Card or Credit Card. You must enroll for the rewards program separately. If you are not already enrolled in one of our rewards programs, click here to sign-up today. Once enrolled in a rewards program, you will need to keep your account open and in good standing in order to earn points.

Form more information regarding your Checking Account and Check Card - call 1-800-TO-WELLS (For Portfolio Management Account SM (PMA) customers, call 1-800-742-4932).
Access additional management & planning tools from Wells Fargo.

Account Summary | Brokerage | Bill Pay | Transfers | My Message Center | Sign Off
Home | Map Center | Contact Us | Locations | Site Map | Apply ©1995-2004 Wells Fargo. All rights reserved.

My Spending Report and Budget Plan ☑ Help

✓ Thank you for creating your Budget Plan. Would you like to set up Budget Alerts to receive automatic email updates about your progress?

Spending Summary as of 10/11/07 - All Payment Methods

Show [Spending Summary ▼] [Go]   Hide Categories with $0.00 | View More Spending | Hide Budget Plan

Next Steps

Edit your Budget Plan to fine-tune individual spending goals.
Discover more financial tools & calculators.
New to my Spending Report? Take a tour or learn more.

Erase High Interest Debt
Consolidate bills with a personal loan.
Apply Now ▶

No Down Payment?
Learn how to buy with little or no money down
Download Free Guide ▶

My Spending - <N>-Month Average

- Checks Written ...... $2,000
- Retail/Department Stores ... $450
- Credit Card Payment (Non-Wells Fargo) ...... $400
- ATM Withdrawals ...... $400
- Groceries ............ $300
- Restaurants ............ $250
- Other ............ $1,050

Accounts Included in This Report Edit
- Credit Card - VISA XXXX-XXXX-XXXX-1234
- CHECKING XXX-XXXX-1238
- Check Card/ATM Card XXXX-XXXX-XXXX-1235

More Accounts >

Inflow

| Category | AUG | SEPT | OCT to Date | Budget Goals | OCT Over/Under |
|---|---|---|---|---|---|
| Deposits | | | | | |
| Direct Deposits | $0.00 | $1,000.00 | $500.00 | $312.00 | $188.00 |
| Other Deposits | $5,000.00 | $5,000.00 | $3,000.00 | $5,000.00 | -$2,000.00 |
| Total Deposits | $5,000.00 | $6,000.00 | $3,500.00 | $5,312.00 | -$1,812.00 |
| Transfers from Other Wells Fargo Accounts/Advances Help | $0.00 | $0.00 | $0.00 | $0.00 | $0.00 |
| Total Inflow | $5,000.00 | $6,000.00 | $3,500.00 | $5,312.00 | -$1,812.00 |

Outflow

| Category ▲ | AUG | SEPT | OCT to Date | Budget Goals | OCT Over/Under |
|---|---|---|---|---|---|
| Spending | | | | | |
| Airlines / Transportation | $240.00 | $100.00 | $0.00 | $50.00 | $50.00 |
| Auto / Gas | $112.36 | $203.06 | $280.25 | $200.00 | ▲ $80.25 |
| Building Supply / Wholesale | $0.00 | $0.00 | $0.00 | $0.00 | $0.00 |
| Cash Advances from Large Back Credit Cards | $0.00 | $0.00 | $0.00 | $0.00 | $0.00 |
| Cash Withdrawals from ATM & Branch | $250.00 | $420.00 | $380.00 | $200.00 | ▲ $180.00 |
| Charity / Community Org. | $0.00 | $0.00 | $0.00 | $0.00 | $0.00 |
| Checks Written | $2,075.00 | $2,100.00 | $2,050.00 | $2,100.00 | $50.00 |
| Contractor / Business Services | $0.00 | $0.00 | $0.00 | $0.00 | $0.00 |
| Education | $0.00 | $0.00 | $0.00 | $0.00 | $0.00 |
| Utilities / Telecom | $120.00 | $99.26 | $73.00 | $150.00 | $77.00 |
| Other Spending Help | $86.52 | $56.33 | $21.50 | $0.00 | $0.00 |
| Total Spending¹ | $4,336.59 | $6,006.78 | $4,626.77 | $4,320.00 | $194.73 |
| Categorize My Spending Help | | | | | |
| Transfers to Other Large Bank Accounts | $100.00 | $100.00 | $100.00 | $100.00 | $0.00 |
| Total Outflow | $4,436.59 | $6,106.78 | $4,726.77 | $4,420.00 | $194.73 |

Payments for Credit Card Purchases / Advances

| Payments to Large Bank Credit Cards Help | $15.00 | $46.33 | $0.00 | $0.00 | $0.00 |

Budget Summary

| Total Inflow | $5,000.00 | $6,000.00 | $3,500.00 | $5,312.00 | -$1,812.00 |
| Total Outflow | $4,436.59 | $6,106.78 | $4,420.00 | $4,420.00 | $194.73 |
| What's Left | $563.41 | -$1,226.77 | $892.00 | $892.00 | -$2006.73 |

View Budget tips to Help build Your Savings or Pay Down Debt

[Edit Budget]

FIG. 14

Set Up/Modify Alerts

Budget Reminders

To track your spending goals with automatic email alerts, simply select your notification preferences below. View a sample alert.
Please note: if you have multiple Budget Plans, these alert preferences will apply to all your Budget Plans.

Mid-Month Progress Report

1152 {
- ☑ Send me a mid-month snapshot of my actual spending compared to my budget. — 1164

Delivery Method  1158
  - ☑ Primary Email: JohnDoe@yahoo.com
  - ☐ Secondary Email: JohnDoe@msn.com
  - ☐ Other Email: JohnDoe@gmail.com

75% of Budget

1154 {
- ☑ Tell me when my total spending is 75% of my monthly budget.

Delivery Method  1160
  - ☑ Primary Email: JohnDoe@yahoo.com
  - ☐ Secondary Email: JohnDoe@msn.com
  - ☐ Other Email: JohnDoe@gmail.com

Over Budget

1156 {
- ☑ Tell me when my total spending is over my budget.

Delivery Method  1162
  - ☑ Primary Email: JohnDoe@yahoo.com
  - ☐ Secondary Email: JohnDoe@msn.com
  - ☐ Other Email: JohnDoe@gmail.com

[cancel]  [Add/Change Email]  [Save]

?Help

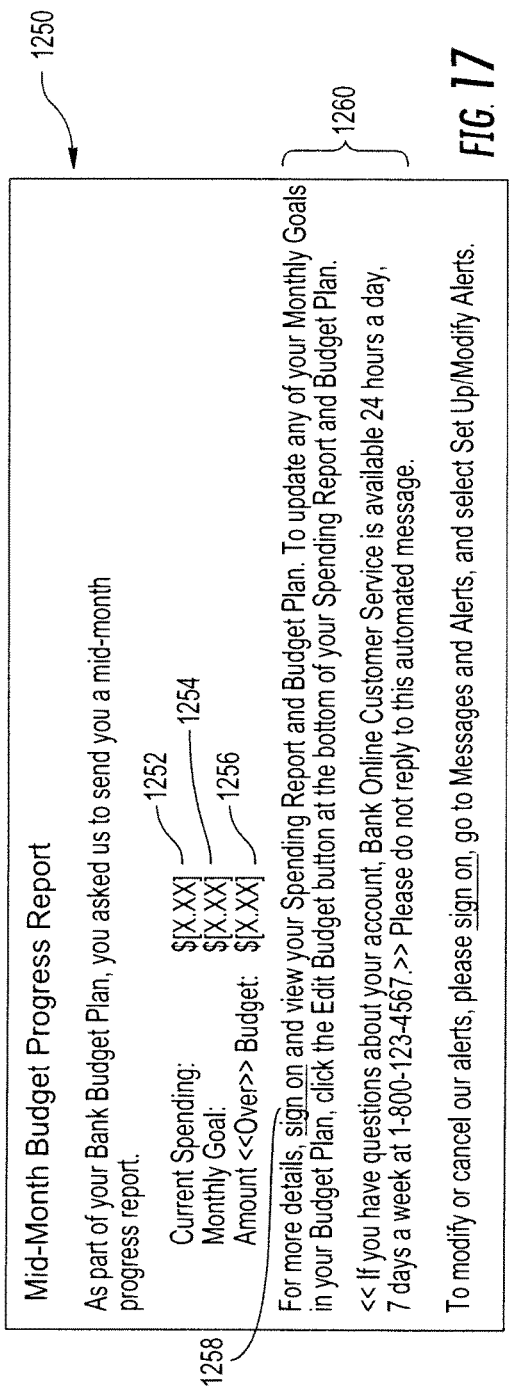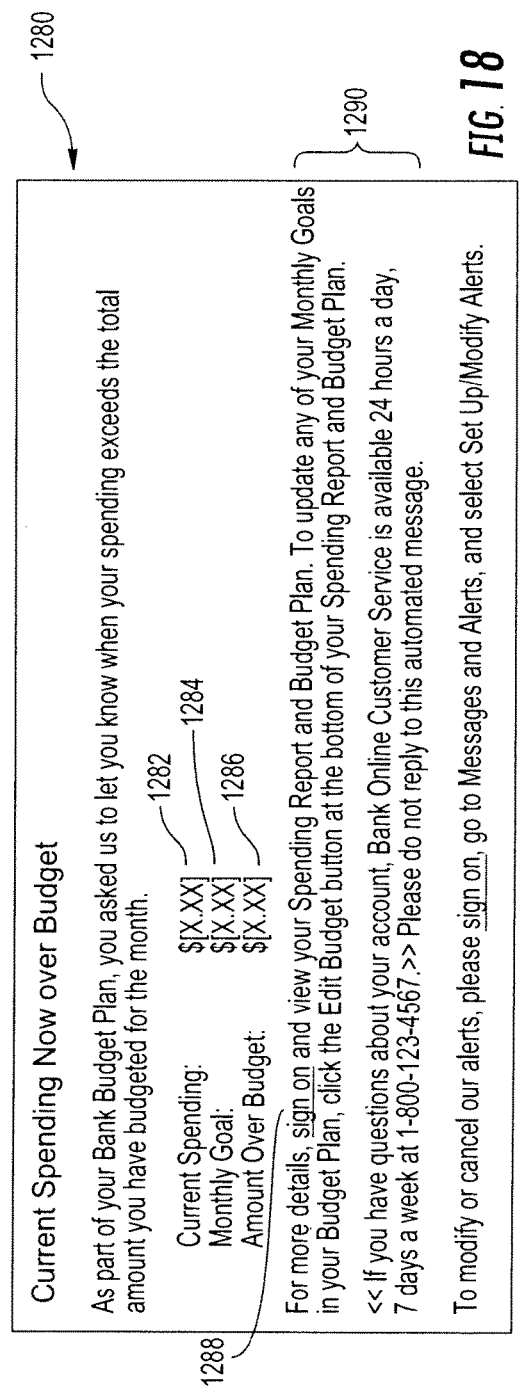

SYSTEM AND METHOD FOR DATA
MANAGEMENT AND FINANCIAL
BUDGETING

CROSS-REFERENCE TO RELATED PATENT
APPLICATIONS

This application claims the benefit of U.S. Provisional Application No. 60/990,903, filed Nov. 28, 2007, which is incorporated by reference herein in its entirety.

TECHNICAL FIELD

This disclosure relates generally to the field of network-based communications. More particularly, this disclosure relates to a method and apparatus for facilitating data management over a network, such as the Internet.

BACKGROUND

The explosive growth of the Internet as a publication and interactive communication platform has created an electronic environment that is changing the way business is transacted. As the Internet becomes increasingly accessible around the world, online communications and business transactions increase exponentially.

Several attempts have been made to facilitate online management of financial data using such network-based communications, namely to provide software packages residing on a computer and configured, for example, to acquire data from network-based financial transaction facilities, and to facilitate organization and management of such data over the network. However, such packages do not provide a satisfactory level of data access and/or detail. For example, many of the current software applications rely on preparation and display of transaction lists, such as credit card monthly statements and/or bank account statements, but do not provide a system to organize such transactions. Other software applications allow categorization of transactions, but require user input and data downloading prior to such user-defined operations. Thus, what is needed is a method and apparatus that facilitate real-time data retrieval, organization, and management over a network, such as the Internet.

SUMMARY

One embodiment relates to a data management system comprising a storage device configured to store financial data for a plurality of financial transactions, the financial data for the plurality of financial transactions being associated with a plurality of different accounts of a user, each of the plurality of financial transactions being associated with one of a plurality of transaction categories; and a server coupled to the storage device and configured to retrieve the financial data for the plurality of financial transactions from the data storage device; receive a request from the user to generate a budget for the user, the budget including budget cash flow amounts for the plurality of transaction categories; determine an average cash flow amount for each of the plurality of transaction categories, the average cash flow amount for each of the transaction categories being based on the financial data for financial transactions associated with the transaction category; generate a budget report including the budget cash flow amount for each of the plurality of transaction categories, the budget cash flow amount for each transaction category being determined based on the average cash flow amount for the transaction category; and provide the budget report to the user.

Another embodiment relates to a method, comprising storing financial data for a plurality of financial transactions in a storage device, each of the plurality of financial transactions being associated with one of a plurality of transaction categories; receiving a request from a user to generate a budget for the user, the budget including budget cash flow amounts for the plurality of transaction categories; determining an average cash flow amount for each of the plurality of transaction categories, the average cash flow amount for each of the transaction categories being based on the financial data for financial transactions associated with the transaction category; generating a budget report including the budget cash flow amount for each of the plurality of transaction categories, the budget cash flow amount for each transaction category being automatically populated with the average cash flow amount for the transaction category; and providing the budget report to the user.

Another embodiment relates to a method of providing data to a mobile device, comprising storing cash flow data in a storage device accessible via a mobile computing device, the cash flow data being associated with a plurality of financial transactions including at least credit card transactions and checking account transactions, and the cash flow data further being associated with a plurality of financial accounts of a user at a financial institution, including at least a credit card account and a checking account; retrieving the cash flow data from the storage device; categorizing the plurality of financial transactions into a plurality of transaction categories, the plurality of financial transactions being categorized based on at least one of a vendor category and a payment method; receiving a first input from the user identifying at least one transaction of the plurality of transaction categories that is to be excluded from the calculation of budget cash flow amounts; for each transaction category, determining the budget cash flow amount based on an average cash flow amount for the transaction category, wherein the average cash flow amount is based on the cash flow data for the financial transactions categorized within the transaction category over a time period, wherein the time period is configurable by the user, and wherein the average cash flow amount is based on excluding the transaction identified by the user; receiving a second input from the user modifying at least one of the budget cash flow amounts; updating the budget cash flow amounts to reflect the second input; and providing a budget report to the mobile device, the budget report including a graphical indication of an actual cash flow amount relative to the budget cash flow amount for at least a portion of the plurality of transaction categories, the budget report further including an amount by which the actual cash flow amount is over or under the budget cash flow amount for the portion of the plurality of transaction categories, the budget report being provided to the mobile device in accordance with user-configurable delivery parameters.

BRIEF DESCRIPTION OF THE DRAWINGS

FIGS. 7A through 7D illustrate exemplary interfaces for facilitating data management according to an exemplary embodiment;

FIGS. 12-16 illustrate user interfaces according to various exemplary embodiments;

FIGS. 17-18 illustrate budget alerts according to various exemplary embodiments;

DETAILED DESCRIPTION OF EXEMPLARY EMBODIMENTS

Figure 1:
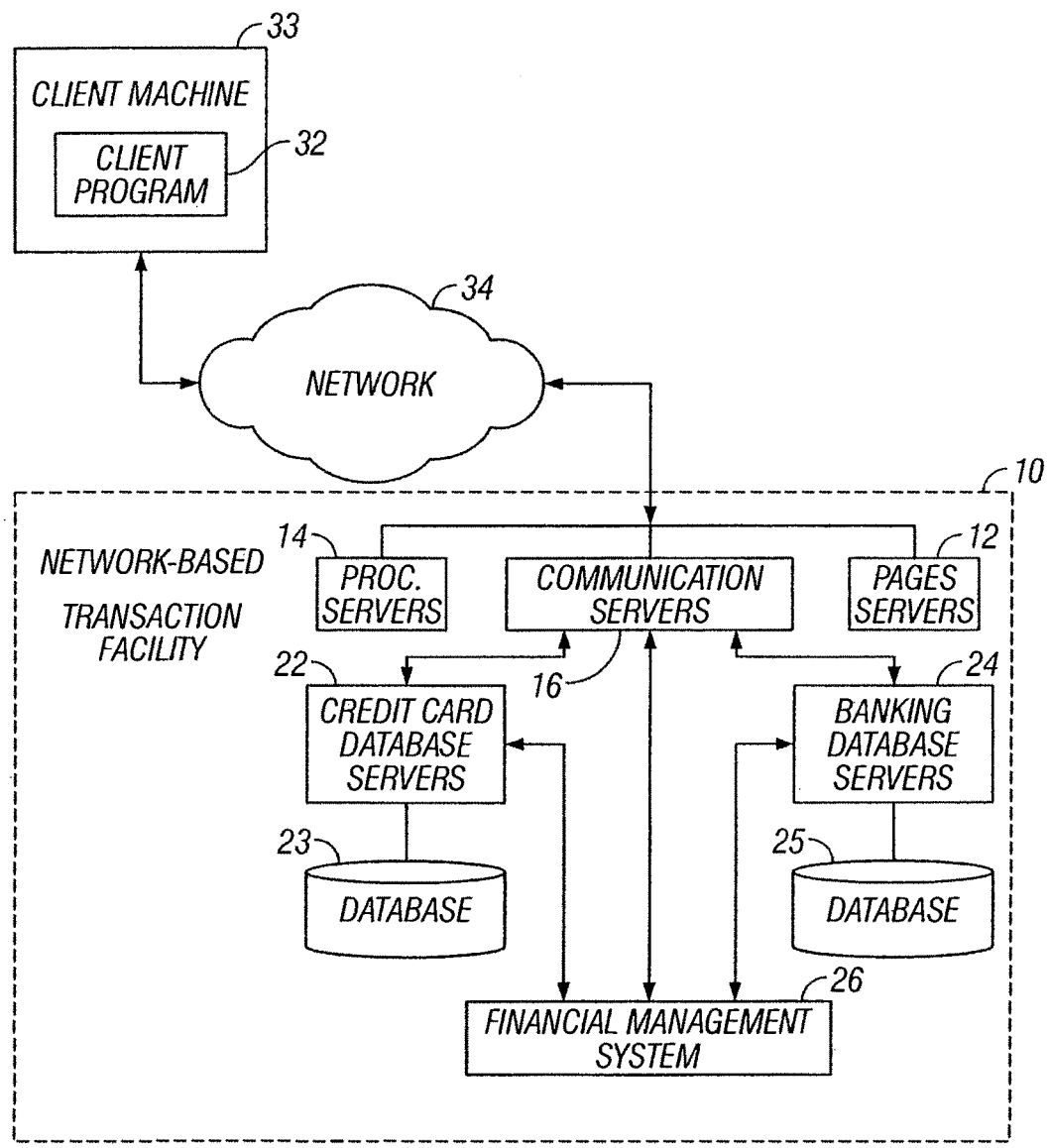
FIG. 1 is a block diagram illustrating an exemplary network-based transaction and communications facility, which facilitates data management according an exemplary embodiment.

FIG. 1 is a block diagram illustrating an exemplary network-based transaction and communications facility 10, such as, for example, a financial transaction facility, which facilitates transactions and communications with users and further facilitates data management. While an exemplary embodiment is described within the context of a financial transaction and communications facility 10, it will be appreciated by those skilled in the art that the embodiments disclosed herein will find application in many different types of computer-based, and network-based, commerce facilities.

The facility 10 includes one or more of a number of types of front-end Web servers, namely, for example, pages servers 12, which deliver Web pages to multiple users, for example markup language documents, and processing servers 14, such as, for example, Common Gateway Interface (CGI) servers or Internet Server Application Program Interface (ISAPI) servers, which provide an intelligent interface to the back-end of the facility 10. In addition, the facility 10 may include communication servers 16 that provide, inter alia, automated communications, such as, for example, electronic mail (email) communications to/from users, and/or instant messaging (IM) functionality, to/from users of the facility 10.

The facility 10 further includes one or more back-end servers, for example, a credit card database server 22, a banking database server 24, each of which maintains and facilitates access to a respective database 23, 25 and a data management system, such as, for example, a financial management system 26, which will be described in further detail below.

The network-based facility 10 may be accessed by a client program 32, such as a browser, for example the Internet Explorer browser distributed by Microsoft Corporation of Redmond, Wash., which executes on a client machine 33 and accesses the facility 10 via a network 34, such as, for example, the Internet. Other examples of networks that a client may use to access the facility 10 include a wide area network (WAN), a local area network (LAN), a wireless network, e.g. a cellular network, or other known networks.

Figure 2:
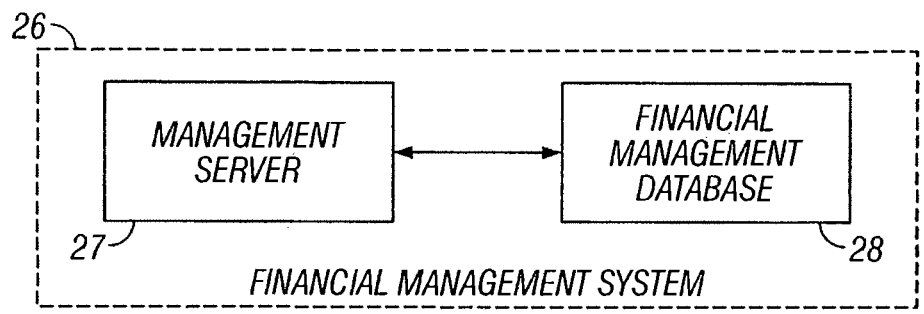
FIG. 2 is a block diagram illustrating a data management system within the network-based transaction and communications facility according to an exemplary embodiment.

FIG. 2 is a block diagram illustrating a data management system within the network-based transaction and communications facility according to an exemplary embodiment. As illustrated in FIG. 2, in one embodiment, the financial management system 26 includes one or more back-end management servers, of which management server 27 is shown, which maintain and facilitate access to a financial management database 28. The management server 27 and the database 28 at least partially implement and support the network-based facility 10 and are specifically provided to enable an exemplary embodiment, as described in further detail below.

Figure 3:
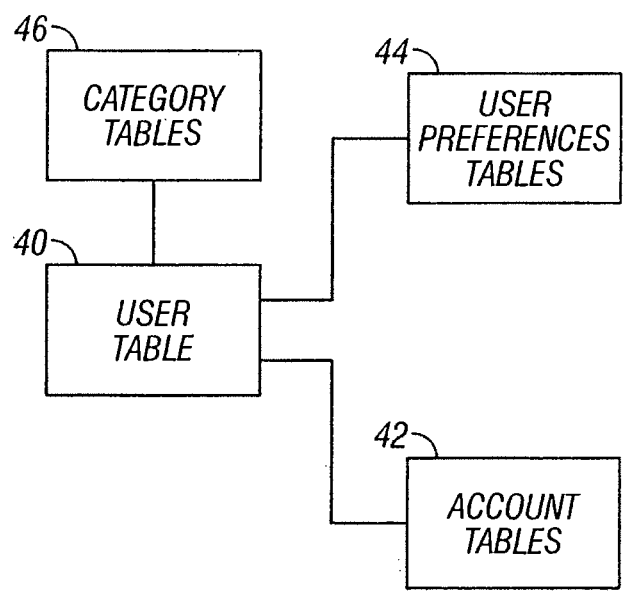
FIG. 3 is a block diagram illustrating a management database, maintained by and accessed via a processing server within the data management system, which at least partially implements and supports the data management system according to an exemplary embodiment.

FIG. 3 is a block diagram illustrating a management database 28, maintained by and accessed via management server 27 within the data management system 26, according to an exemplary embodiment. The database 28 may, in one embodiment, be implemented as a relational database, and includes a number of tables having entries, or records, that are linked by indices and keys. In an alternative embodiment, the database 28 may be implemented as a collection of objects in an object-oriented database.

Central to the database 28 shown in FIG. 3 is a user table 40, which contains records for each entity or user of the facility 10. The database 28 also includes an accounts table 42, which may be linked to the user table 40 and may be populated with account information and data related to each user of the network-based facility 10.

The database 28 may include a number of other tables, which may also be shown to be linked to the user table 40, for example, tables specifically provided to enable an exemplary embodiment. One or more category tables 46 are configured to store multiple categories and respective category codes used to organize financial transactions associated with each user, as described in further detail below. In one embodiment, the stored categories include, for example, lodging, airlines, auto rental, restaurants, education, services, health care, gas/auto, retail, groceries, other travel/entertainment, other credit card transactions, ATM withdrawals, cash advances, checks written, electronic payments from checking account, transfers of funds, non-card withdrawals from the checking account, and other non-categorized online bill payment transactions. Alternatively, other categories related to financial transactions associated with a user may be stored in the category tables 46.

In one embodiment, user-generated access preferences, such as, for example a data access indicator, which indicates whether the user has access to data provided by the financial management system 26, and/or user-generated communication preferences, such as, for example, an email preference, which indicates whether the user has email notification privileges are stored in a user database within the transaction facility 10, such as, for example, in the banking database 25. All the above preferences are part of a user profile constructed and stored for each user. In an alternate embodiment, the user-generated access preferences and/or the user-generated communication preferences may be stored in one or more user preferences tables 44 within the financial management database 28.

In some embodiments, prior to any communication between client 32 and the network-based facility 10, data related to financial transactions associated with each user are retrieved from respective databases maintained and accessed by the credit card database servers 22 and the banking database servers 24.

Figure 4:
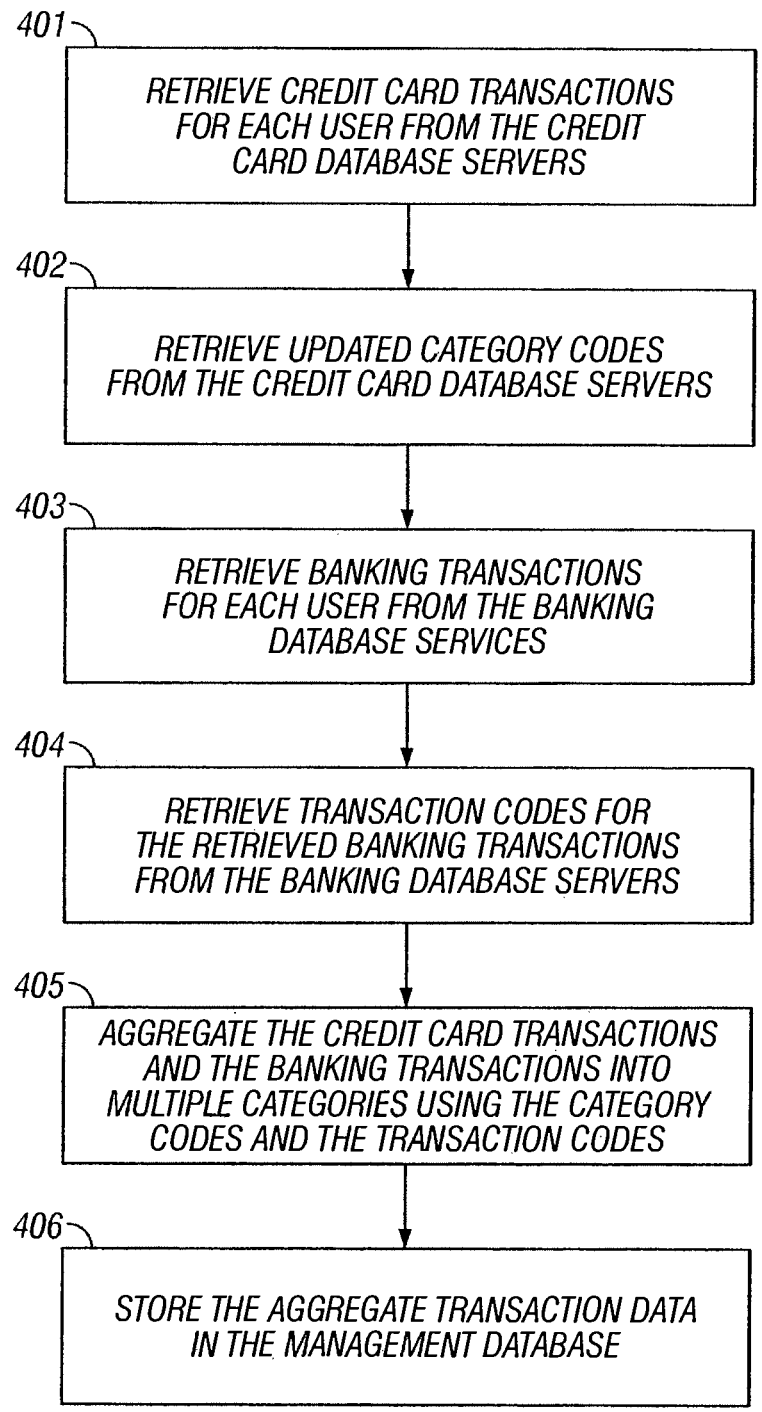
FIG. 4 is a flow diagram illustrating a method for aggregating data according to an exemplary embodiment.

FIG. 4 is a flow diagram illustrating a method for aggregating data according to an exemplary embodiment. As illustrated in FIG. 4, at processing block 401, credit card transactions are retrieved for each user from the credit card database servers 22. In one embodiment, the management server 27 requests data related to credit card transactions associated with each user of the facility 10, the credit card transactions being stored in the database 23 associated with the credit card database servers 22. The credit card database servers 22 retrieve the credit card transactions and transmit the related data to the management server 27. Each credit card transaction datum includes, for example, a description of the transaction, the amount of the transaction, the location and date of the transaction, a predetermined credit card transaction code, and other data pertinent to the specific transaction. In an alternate embodiment, the retrieval of credit card transactions information may be performed in real-time during communications between the client 32 and the network-based facility 10.

At processing block 402, updated category codes are retrieved from the credit card database servers 22. In one embodiment, the management server 27 requests the updated category codes from the credit card database servers 22, such as, for example, merchant category codes defined by a merchant segmentation operation. The credit card database servers 22 retrieve the updated category codes from the associated database 23 and transmit the retrieved category codes to the management server 27. In one embodiment, each retrieved category code corresponds to a category used in subsequent aggregation and management of data. In an alternate embodiment, the retrieval of updated category code information may be performed in real-time during communications between the client 32 and the network-based facility 10.

At processing block 403, banking transactions are retrieved for each user from the banking database servers 24. In one embodiment, the management server 27 requests data related to banking transactions associated with each user of the facility 10, the banking transactions being stored in the database 25 associated with the banking database servers 24. The banking database servers 24 retrieve the banking transactions and transmit the related data to the management server 27. In one embodiment, the retrieved banking transactions include, for example, debit account transactions, ATM transactions, check transactions, fund transfer transactions, non-card withdrawal transactions, and other transactions related to bank accounts owned by each user of the facility 10. In an alternate embodiment, the retrieved banking transactions include electronic bill payment transactions associated with each user and stored in the respective database 25. In another alternate embodiment, the retrieval of banking transactions information may be performed in real-time during communications between the client 32 and the network-based facility 10.

At processing block 404, transaction codes for the requested banking transactions are retrieved from the banking database servers 24. In one embodiment, the management server 27 requests the transaction codes associated with the banking transactions from the banking database servers 24. The banking database servers 24 retrieve the transaction codes and transmit the codes to the management server 27. In one embodiment, each banking transaction performed for a user account has an associated banking transaction code, which identifies the particular banking transaction. In an alternate embodiment, the retrieval of the transaction codes may be performed in real-time during communications between the client 32 and the network-based facility 10.

At processing block 405, the data related to the credit card transactions and the data related to the banking transactions are aggregated and organized into multiple categories using the retrieved category codes and transaction codes. In one embodiment, the management server 27 aggregates the retrieved data and organizes data based on the categories stored in the category tables 46.

At processing block 406, the aggregate transaction data are stored in the financial management database 28. In one embodiment, the management server 27 stores the aggregate transaction data into the account tables 42 within the database 28.

According to an exemplary embodiment, the retrieval and processing of data related to financial transactions of each user are performed prior to any communication between client 32 and the network-based facility 10. The management server 27 retrieves financial transaction information performed during a predetermined period of time, for example credit card transactions and banking transactions performed within the previous sixty days. Alternatively, the management server 27 may retrieve financial transaction information performed within any predetermined amount of time. In an alternate embodiment, subsequent to the initiation of communications between the client 32 and the network-based facility 10, the retrieval and processing of data related to financial transactions of each user are performed in real-time, allowing each user to access the updated data in real-time.

Figure 5:
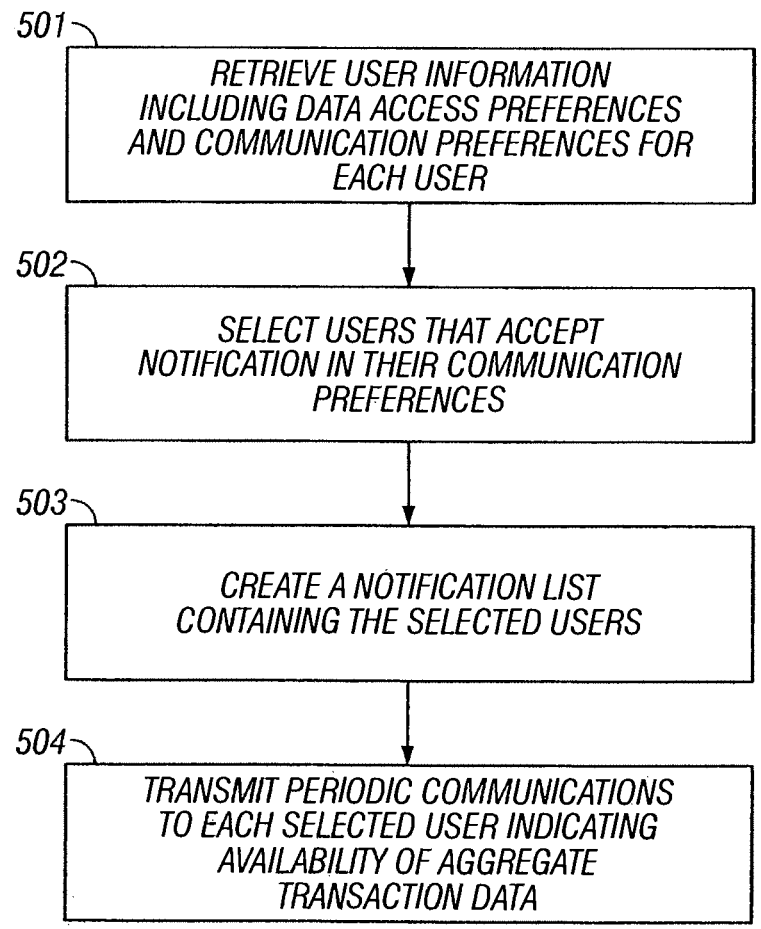
FIG. 5 is a flow diagram illustrating a method for transmitting communications to users indicating availability of aggregate data according to an exemplary embodiment.

According to an exemplary embodiment, electronic communications are exchanged between the facility 10 and the client 32 to indicate to each user the availability of the aggregate transaction data, as described in further detail below. FIG. 5 is a flow diagram illustrating a method for transmitting communications to users indicating availability of aggregate transaction data, according to an exemplary embodiment of the invention. As illustrated in FIG. 5, at processing block 501, user information including data access preferences and communication preferences for each user are retrieved from the database 25, or, in the alternative, from the management database 28. In one embodiment, the banking database servers 24 access the database 25 and retrieve user information, data access preferences and communication preferences associated with each user.

At processing block 502, users that have not opted out of communications indicating availability of aggregate transaction data and, thus, accept electronic notifications as a communication preference are selected. In one embodiment, the banking database servers 24 select only users that have not opted out of receipt of electronic notifications indicating the availability of aggregate transaction data.

At processing block 503, in one embodiment, the banking database servers 24 create a notification list containing the selected users. Finally, at processing block 504, periodic communications are transmitted to each selected user indicating the availability of aggregate transaction data. In one embodiment, the banking database servers 24 initiate an electronic communication with the client 32 via the communication servers 16 and transmit an email to each selected user indicating the availability of aggregate transaction data. Alternatively, the banking database servers 24 may initiate periodic communications with the client 32 via the communication servers 16 and transmit notifications related to the aggregate transaction data, such as, for example, periodic reminders of data updates or any other types of user notifications.

Figure 6:
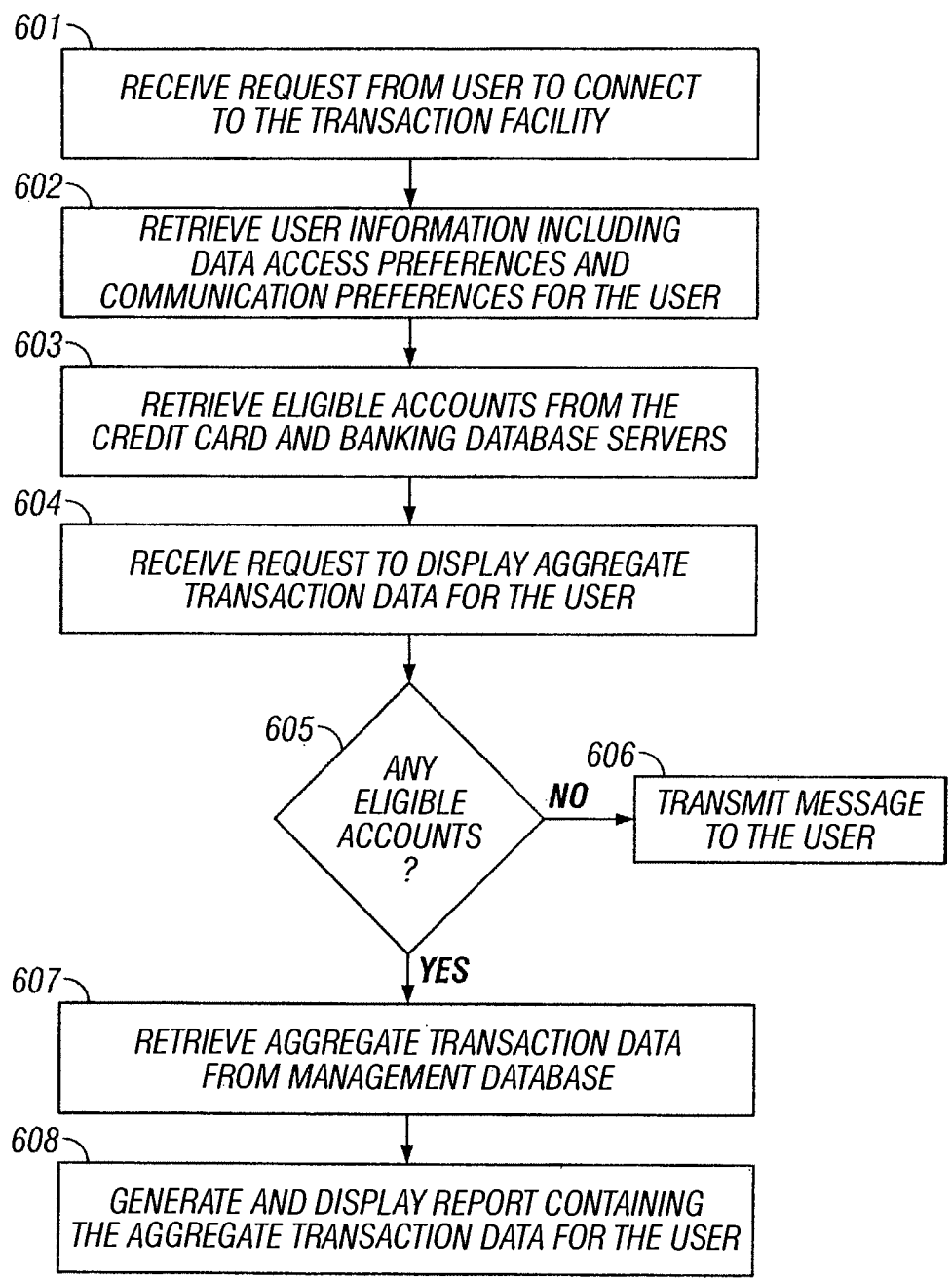
FIG. 6 is a flow diagram illustrating a method for facilitating data management according to an exemplary embodiment of the invention.

FIG. 6 is a flow diagram illustrating a method for facilitating data management according to an exemplary embodiment. As illustrated in FIG. 6, at processing block 601, a request to connect to the network-based transaction and communications facility 10 is received from a user. In one embodiment, the user initiates a communication with the facility 10 via the client 32 and the communication servers 16 and transmits a request to connect to the facility 10 through an authentication or login procedure.

At processing block 602, user information including data access preferences and communication preferences for each user are retrieved from the database 25 or, in the alternative, from the management database 28. In one embodiment, the banking database servers 24 access the database 25 and retrieve user information, data access preferences, and communication preferences associated with each user. Alternatively, the management server 27 accesses the database 28 and retrieves user information from the user table 40 and data access preferences and communication preferences associated with each user from the user preferences tables 44. The data access preferences indicate whether the user has access to data provided by the financial management system 26. If the user does not have access to data, the management server 27 transmits a message in a message window to the client 32 via the communication servers 16 and the network 34 and denies access to the data.

Otherwise, at processing block 603, eligible accounts associated with the user are retrieved from the databases 23, 25 associated with the credit card database servers 22 and the banking database servers 24, respectively. In one embodiment, subsequent to the receipt of the request to connect to the facility 10, the management server 27 communicates with the credit card database servers 22 and the banking database servers 24 and requests the financial accounts eligible for the data management operations. The respective servers 22 and 24 retrieve corresponding credit card accounts and banking accounts associated with the user and transmit the account information to the management server 27.

At processing block 604, a request to display aggregate transaction data in real-time is received from a user. In one embodiment, the user initiates a communication with the facility 10 via the client 32 and the communication servers 16 and transmits a request to display aggregate transaction data. The management server 27 receives the request from the communication servers 16 and proceeds to display the requested data, as described below.

At processing block 605, a decision is made whether the user has any accounts eligible for real-time data management operations. In one embodiment, the management server 27 makes a determination whether the user has any accounts eligible for data management operations by reviewing the retrieved accounts. If the user does not have any eligible accounts, at processing block 606, the management server 27 transmits a message in a message window to the client 32 via the communication servers 16 and the network 34 and denies access to the data.

Otherwise, if the user has eligible accounts, at processing block 607, aggregate transaction data associated with the eligible accounts of the user is retrieved. In one embodiment, the management server 27 accesses the management database 28 and retrieves the aggregate transaction data associated with the eligible accounts of the user from the account tables 42 within the database 28.

Finally, at processing block 608, a report containing the aggregate transaction data is generated and displayed for the user. In one embodiment, the management server 27 generates a report containing the aggregate transaction data and transmits the report to the client 32 via the communication servers 16, the pages servers 12, and the network 34. The report is displayed for the user in a report window within a user interface area. The user interface area presented to the user facilitates user interaction and communications with the network-based facility 10, as described in further detail below in connection with FIGS. 7A-7D, 8, and 9.

Figure 7B:
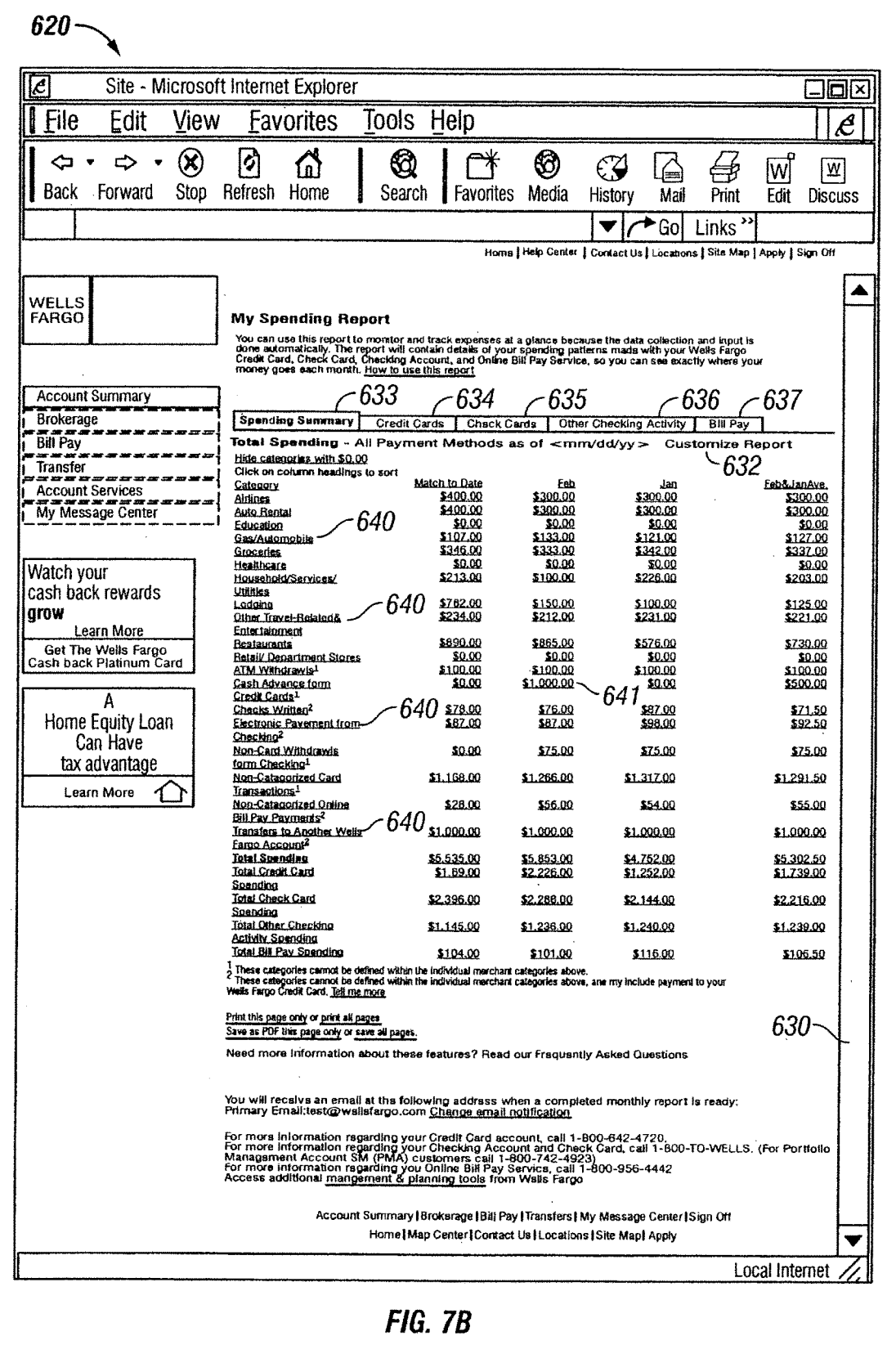

FIGS. 7A-7D illustrate exemplary interfaces for facilitating data management according to an exemplary embodiment. As illustrated in FIG. 7A, in one embodiment, the facility 10 displays a user interface area 610 in a window within the client machine 33 to facilitate communication of the request to display aggregate transaction information data for the user. The user interface area 610 includes a summary of accounts owned by the user, showing, for example, banking account numbers and balances, credit card account numbers and balances, loan account numbers and balances, and other financial information. The user interface area 610 further includes a link 611, which facilitates transmission of the request to the facility 10. The user selects the "View Spending Report" link 611 with a conventional mouse click command and the client machine 33 transmits the request to the management server 27 via the network 34 and the communication servers 16.

As illustrated in FIG. 7B, in one embodiment, the management server 27 displays the report in a user interface area 620. The user interface area 620 includes a report window 630, a number of command buttons, including, for example, a Customize Report button 632, and a number of window tabs, including a Spending Summary tab 633, a Credit Cards tab 634, a Check Cards tab 635, a Other Checking Activity tab 636, and a Bill Pay tab 637.

In one embodiment, if the Spending Summary tab 633 is activated with a conventional mouse click command, the report window 630 displays aggregate transaction data received from the management server 27. The aggregate transaction data are organized according to categories 640 stored in the category tables 46 within the management database 28. Each category 640 is an interactive link configured to facilitate further user interaction.

If the user activates one of the other tabs 634-637 with a conventional mouse click command, the report window 630 displays statements corresponding to respective credit card accounts, check card accounts, checking accounts, and/or bill pay accounts. As illustrated in FIG. 7D, if the user activates the Check Cards tab 635, for example, the report window 630 displays detailed individual check card transactions 650.

Figure 8:
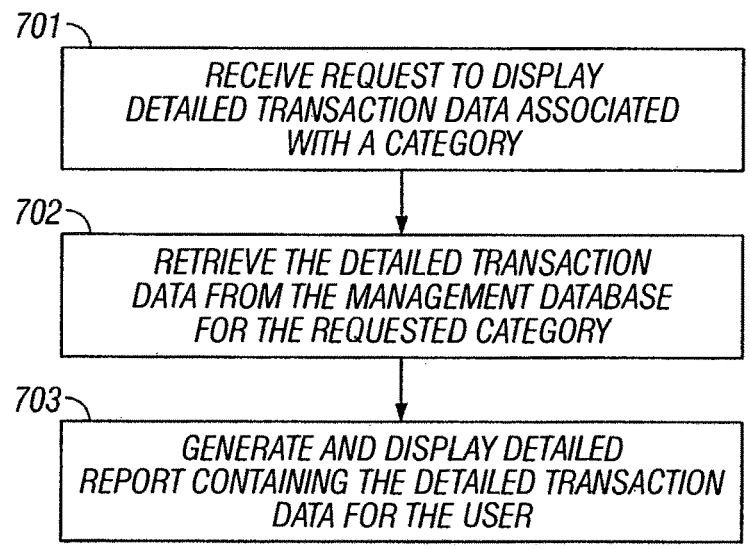
FIG. 8 is a flow diagram illustrating a method for facilitating display of detailed aggregate data according to an exemplary embodiment.

FIG. 8 is a flow diagram illustrating a method for facilitating display of detailed aggregate data according to an exemplary embodiment. As illustrated in FIG. 8, at processing block 701, a request to display detailed transaction data associated with a category is received. In one embodiment, referring also to FIG. 7B, the user selects an amount link 641 corresponding to a category 640 with a conventional mouse click command. Responsive to selection of the link 641, the client 32 transmits the request to display detailed transaction data associated with the category through the network 34 and the communication servers 16.

At processing block 702, the detailed transaction data for the requested category are retrieved from the management database 28. In one embodiment, the management server 27 receives the request from the client 32 and retrieves the detailed transaction data associated with the selected category from the account tables 42.

At processing block 703, a detailed report containing the detailed transaction data are generated and displayed for the user. In one embodiment, the management server 27 generates the detailed report containing the detailed transaction data and transmits the report to the client 32 via the communication servers 16, the pages servers 12, and the network 34. The detailed report is displayed for the user in a separate detailed report window (not shown) within the user interface area 620 shown in FIG. 7B.

Figure 9:
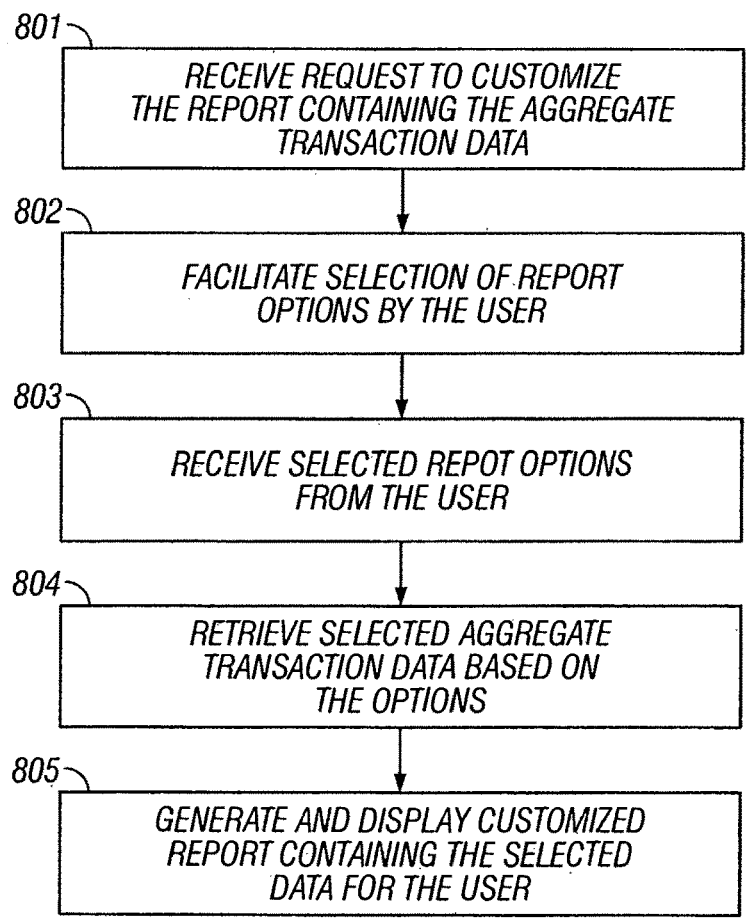
FIG. 9 is a flow diagram illustrating a method for facilitating customization of the aggregate data based on user input according to an exemplary embodiment.

FIG. 9 is a flow diagram illustrating a method for facilitating customization of the aggregate data based on user input according to an exemplary embodiment. As illustrated in FIG. 9, at processing block 801, a request to customize and display the report containing the aggregate transaction data is received. In one embodiment, referring also to FIG. 7B, the user selects the Customize Report link 632 with a conventional mouse click command. Responsive to selection of the link 632, the client 32 transmits the request to customize and display the report containing the aggregate transaction data through the network 34.

At processing block 802, the management server 27 facilitates selection of report options by the user. As illustrated in FIG. 7C, in one embodiment, subsequent to the receipt of the request to customize and display the report containing the aggregate transaction data, the management server 27 generates and displays an option window 660 in the user interface area 620. The option window 660 includes a number of customizing report options, such as, for example, a list of banking and/or credit card accounts 661, and facilitates selection by the user of one or more accounts that the user wants removed and/or added from the report containing the aggregate data.

Subsequent to selection of options with a conventional mouse click command, the client 32 transmits the selected options to the facility 10 via the network 34. At processing block 803, the management server 27 receives the selected report options transmitted by the client 32.

At processing block 804, selected aggregate transaction data are retrieved based on the report options. In one embodiment, the management server 27 applies the customizing report options to the current communication session with the client 32 and retrieves selected aggregate transaction data from the account tables 42 within the management database 28 based on the specific accounts selected by the user.

At processing block 805, a customized report containing the selected aggregate transaction data is generated and displayed for the user. In one embodiment, the management server 27 generates the customized report containing the selected data and transmits the report to the client 32 via the communication servers 16, the pages servers 12, and the network 34. The customized report is displayed for the user in a separate customized report window (not shown) within the user interface area 620 shown in FIG. 7B.

In an alternate embodiment, the option window 660 may include additional customizing report options to facilitate creation and display of various customized reports for the user. For example, the option window 660 may include a list of check card accounts, and/or other loan accounts associated with the user.

In another alternate embodiment, the option window 660 may facilitate user selection of an option to display detailed transactional information in its entirety over a significant period of time, such as, for example a rolling 13-month period of historical data. In yet another embodiment, the option window 660 may enable the user to compare a predetermined period of time from a current year with a similar period from a previous year, and produce profiles of financial expenditures, such as month-over-month, year-over-year, or year-to-date.

In another embodiment, the option window 660 may allow the user to save and retrieve report views, eliminating the need to recreate the report views during subsequent sessions. Users are given the option to save the customized report view as a default view, which then applies on a go-forward basis or until the user changes the selected report view. The management server 27 receives the saved customized report view and stores the report view as the default view in the management database 28.

In yet another embodiment, the option window 660 may enable the user to enter and save a budget amount for each predefined category 640 in order to track variances. The management server 27 receives the saved budget amounts and stores the budget amounts in connection with the respective categories 640 in the management database 28.

In yet another embodiment, the option window 660 may facilitate reclassification of individual transactions 650 to a different category 640, including past transactions stored in the database 28. The management server 27 may store the reclassified transactions in the database 28 and may also re-categorize the respective vendor/payee on a go-forward basis.

In yet another embodiment, the user interfaces 610 and 620, and the windows 630, 660, may include a link to other marketing or product-related sites of the facility 10 to facilitate user navigation to the respective sites.

In yet another embodiment, the option window 660 may enable the user to create custom categories 640 and to store the custom categories in the database 28 through the management server 27.

Figure 10:
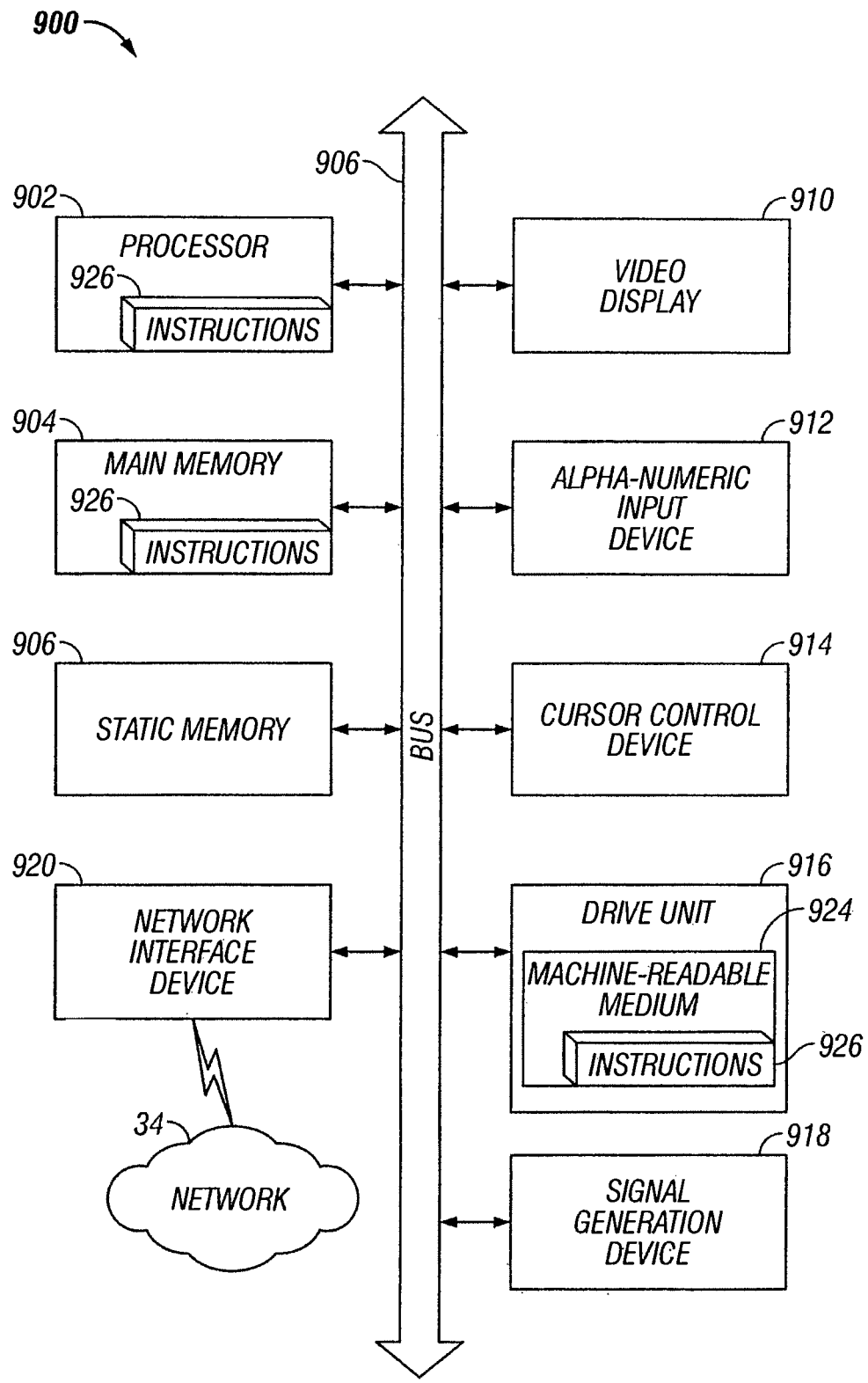
FIG. 10 is a diagrammatic representation of a machine in the exemplary form of a computer system within which a set of instructions may be executed.

FIG. 10 shows a diagrammatic representation of a machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a Web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910, e.g. a liquid crystal display (LCD) or a cathode ray tube (CRT). The computer system 900 also includes an alphanumeric input device 912, e.g., a keyboard, a cursor control device 914, e.g. a mouse, a disk drive unit 916, a signal generation device 918, e.g. a speaker, and a network interface device 920.

The disk drive unit 916 includes a machine-readable medium 924 on which is stored a set of instructions, i.e. software, 926 embodying any one, or all, of the methodologies described above. The software 926 is also shown to reside, completely or at least partially, within the main memory 904 and/or within the processor 902. The software 926 may further be transmitted or received via the network interface device 920.

Figure 11:
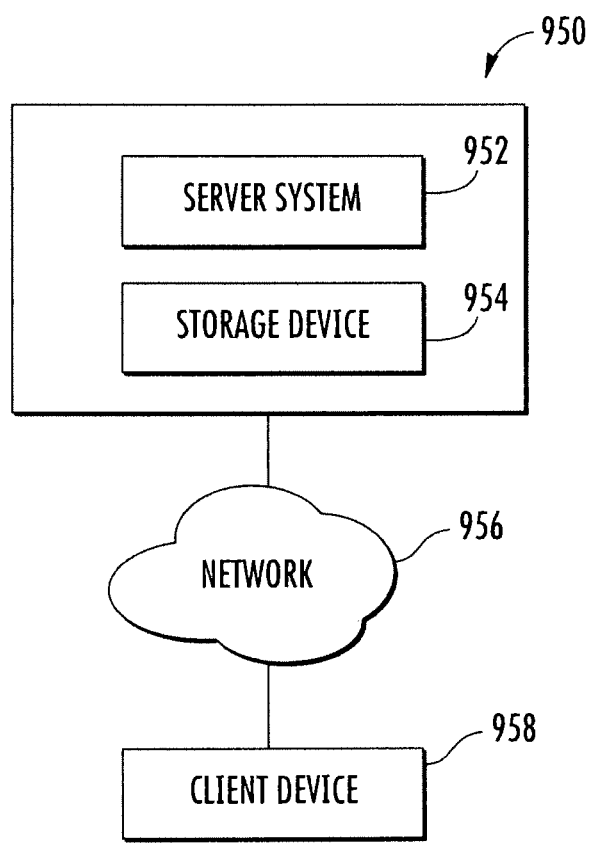
FIG. 11 is a block diagram of a financial management system according to an exemplary embodiment.

Referring now to FIG. 11, a system 950, such as a financial management system, is shown according to an exemplary embodiment, and may include a server system 952 (e.g., one or more servers, processors, computer logic or engine components, etc.) coupled to a storage device 954 (e.g., a memory, database, etc.). It should be understood that server system 952 and storage device 954 may include one or more servers and/or storage devices, respectively. System 950 is configured to provide financial management data to a client device 958 via a network 956. Server system 952 may include various types of logic configured to manage various types of data, including account management logic for managing various types of accounts associated with various users or account holders, processing logic configured to process transactions for the various bank accounts, and interface logic for connecting system 950 with user systems such as client device 958 and providing various user interfaces (e.g., providing users with access to an on-line banking area of a website of a financial institution such as a bank, etc. via a network such as the Internet, etc.). Storage device 954 is configured to store financial data for a number of different user accounts, such as a checking account, a credit card account, etc., and facilitate retrieval and usage of such data by server system 952. In one embodiment, the accounts may all be associated with a single financial institution. In other embodiments, the accounts may be associated with different financial institutions. Network 956 may include a wide variety of wired and/or wireless networks (e.g., the Internet, etc.) as also discussed further herein. Further, client device 958 may include any of a number of devices such as desktop computers, laptop computers, handheld computers (e.g., personal digital assistants (PDAs), smart phones, etc.), and so on.

Figure 12:
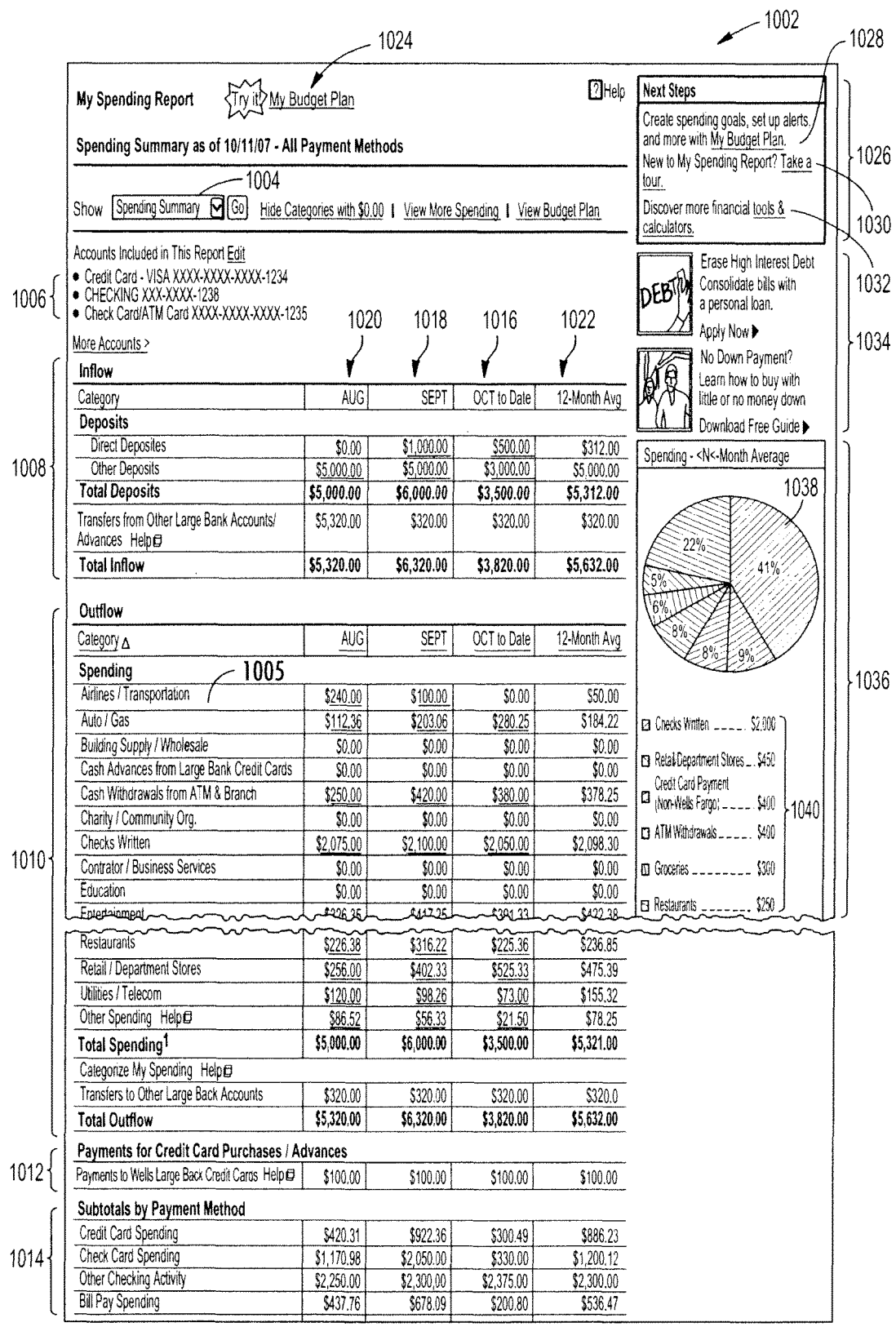

As shown in FIG. 12, according to an exemplary embodiment, system 950 is configured to provide a user interface 1002 (e.g., a display, etc.) to client device 958. According to one embodiment, user interface 1002 may be a spending or cash flow report or summary that provides a user with a summary of spending/savings amounts for various types of transactions. As shown in FIG. 12, user interface 1002 may include fields that identify the accounts 1006 included in the report, inflow transactions 1008, outflow transactions 1010, payments 1012 for credit card purchases or advances, and subtotals 1014 categorized by payment method. An option 1004 may permit a user to change between views. For example, option 1004 as shown in FIG. 12 is shown as "Spending Summary." Option 1004 may provide a user with, for example, a drop-down menu that enables a user to view credit card transactions only, check card transactions only, or create a customized view.

In one embodiment, the various transactions may be categorized into a number of transaction categories 1005 (e.g., merchant or vendor categories such as airlines/transportation, auto/gas, etc.). For each transaction category, user interface 1002 may provide the current cash flow amount (e.g., month-to-date) 1016, cash flow amounts 1018, 1020, for the previous 2 months, and an average cash flow amount 1022 (e.g., a 12-month average, a 6-month average, a 3-month average, etc.). User interface 1002 may further include a graphical display 1036 of cash flow trends. For example, a graph 1038 (e.g., a pie chart, bar graph, etc.) may be used to graphically depict the relative amounts spent by a user for various transaction categories during a specified time period. Graph 1038 may include transaction categories that are selected by a user, may include the top 10 spending categories (or another number of categories such as 5, 20, or a user-configurable amount), or may include transaction categories that are selected by another method. A table or listing 1040 may provide a key to match the amounts specified in graph 1038 with each transaction category 1005.

According to an exemplary embodiment, user interface 1002 may include a display portion 1026 (e.g., a "next steps" module, etc.) that provides the user with links to other applications and/or services that the user may find useful. For example, display portion 1026 may include one or more links 1028, 1030, 1032 that enable a user to create a budget, take a tour of other services offered, or utilize other financial tools and/or calculators. By selecting one of links 1028, 1030, 1032, the user may be directed to a new display screen or page associated with the link. For example, should a user select link 1028 ("My Budget Plan"), a user may be directed to a user interface similar to that shown in FIG. 13. The links displayed in display portion 1026 may be a subset of a larger group of links that are available for display to the user. The links that are displayed to the user may be selected from the available links based on a user profile (e.g., what types of accounts the user does or does not currently maintain, whether the user's cash flow trends generally show a surplus or deficit, etc.), user preferences, or other criteria, in order to enhance the relevance of the displayed links to the user. Other links 1034 may also be provided.

Figure 13:
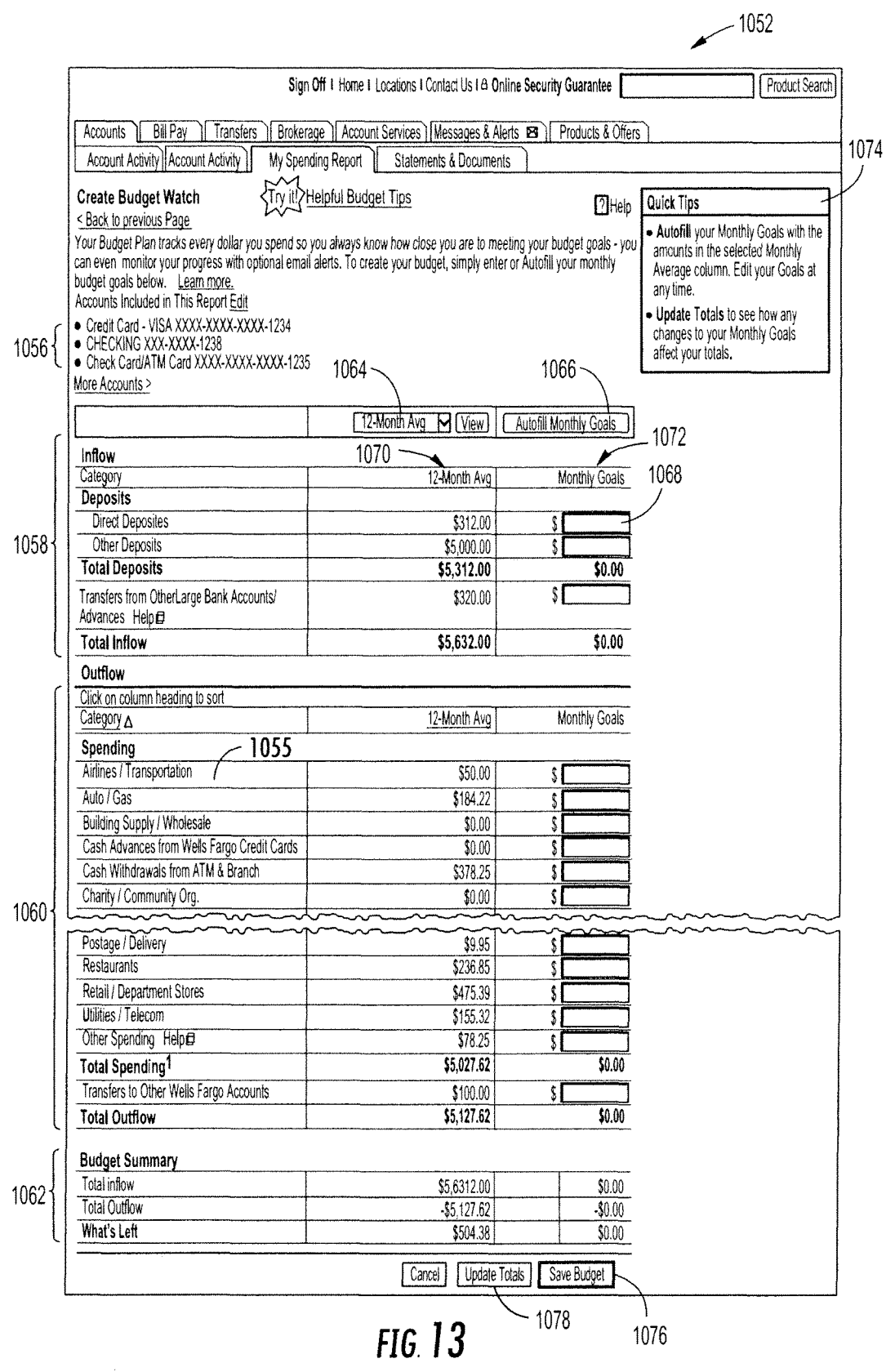

Referring now to FIG. 13, a user interface 1052 is shown according to an exemplary embodiment. As shown in FIG. 13, user interface 1052 may be a "Create Budget Watch" display or interface. User interface 1052 may include much of the same information as user interface 1002, such as the accounts 1056 that are included in the report, inflow transactions 1058, outflow transactions 1060, and a budget summary section 1062. User interface 1052 may provide an average cash flow amount 1070 for various transaction categories 1055. The average cash flow amount may be determined over a predetermined time period 1064. According to an exemplary embodiment, time period 1064 may be user-configurable such that a user may adjust the time period between varying lengths of time (e.g., 12 months, 6 months, 3 months, etc.).

Display 1052 is intended to facilitate the generation of a budget or budget report for a user. According to one embodiment, user interface 1052 includes an option 1066 ("Autofill Monthly Goals") that is selectable by a user to populate budget cash flow amounts 1072 (e.g., monthly goals or targets for savings, spending, etc.) for each of transaction categories 1055 with the average cash flow amount 1070 for the category. Further, by enabling a user to adjust the time period 1064 over which average cash flow amounts 1070 are determined, the user can adjust the average cash flow amounts accordingly. It should be understood that for purposes of illustration and discussion, the term "cash flow amount" is used when referencing both cash outflows (e.g., bill payments, expenses) and cash inflows (e.g., cash deposits, automatic deposits from an employer, etc.).

For example, as shown in FIG. 13, a user has selected to use a 12-month time period 1064 over which to calculate the average cash flow amounts 1070 for each transaction category 1055. Should a user desire to automatically populate budget cash flow amounts 1072 for each of transaction categories 1055, the user can simply select option 1066, upon which budget cash flow amounts 1072 will be populated with the average cash flow amounts 1070. For example, as shown in FIG. 13, the 12-month average cash flow amount for auto/gas is $184.32, such that should a user select option 1066, the budget cash flow amount 1072 for auto/gas would be $184.32.

Upon the budget cash flow amounts 1072 being populated with the average spending amounts 1070, the user may be provided with the option to manually adjust any of the budget cash flow amounts by selecting the appropriate budget cash flow amount and manually typing in a new amount into text box or field 1068. Upon any updates to the budget cash flow amounts, a user may select option 1078 ("Update Totals") to update the budget report with the modified amounts.

According to another embodiment, rather than budget cash flow amounts 1072 being populated upon selection of link or option 1066, budget cash flow amounts 1072 may be populated with average cash flow amounts 1070 without prompting by a user, such that a user would, for example, be provided with budget cash flow amounts 1072 upon the initial display of user interface 1052 (e.g., upon selection of link 1028 shown in FIG. 12). Option 1066 may then be modified to provide the user with the option to accept/reject the populated amounts in the budget report.

According to yet another embodiment, a user may be provided with the option to view the individual transactions within a transaction category over a period of time (e.g., time period 1064) such that the user can identify one or more transactions to be excluded from the average spending amount calculations, and therefore the budget spending amounts. For example, should a user have a one-time cost for airlines/transportation related to, for example, finding a new job, the user may not expect this to be a recurring expense, and thus may desire to exclude the cost from the budget calculations. Accordingly, the user may identify the transaction (e.g., highlight, click on, etc.) and the transaction will then be excluded from the average spending and budget calculations. This may provide the user with the ability to establish budgetary guidelines that effectively approximate average spending trends by excluding certain unexpected and/or unusual expenses (and/or income) that may otherwise provide the user with inaccurate estimates of spending/saving trends.

According to one embodiment, once a user is finished creating and modifying a budget, the user may elect to save the budget by selecting option 1076 ("Save Budget"). In some embodiments, the user may create and save numerous different budgets in order to evaluate different budget scenarios (e.g., to evaluate changes in budgeted spending/saving amounts). Saved budgets may also be deleted by the user.

Referring to FIG. 14, a user interface 1102 is shown according to an exemplary embodiment. User interface 1102 may be a spending report and budget plan interface that provides a display of cash flow information and budget information simultaneously for a variety of categories. User interface 1102 includes information similar to that provided in user interface 1002 shown in FIG. 12. For example, user interface 1102 may identify the accounts 1106 that are included in the report, inflow transactions 1108, outflow transactions 1110, and payments 1112 for credit card purchases and advances. A budget summary 1114 may further be provided. As also shown in FIG. 14, an option 1104 may provide a user with, for example, a drop-down menu that enables a user to view credit card transactions only, check card transactions only, etc., or create a customized view. The various transactions may be categorized into transaction categories 1105, and user interface 1102 may provide a current cash flow amount 1116 (e.g. month to date) and cash flow amounts 1118, 1120 for the previous 2 months (or other time periods), similar to FIG. 13.

In addition, in FIG. 14, user interface 1102 may further provide budget cash flow amounts 1122 (e.g., budget goals) generated using interface 1050 shown in FIG. 13, and over/under amounts 1124 for the current month. The over/under amounts 1124 may represent the amount that the actual spending/saving of a user (as, for example, indicated by current cash flow amounts 1116) is over or under budget cash flow amounts 1122. According to an exemplary embodiment, over/under amounts that indicate that a user is outside of the budget cash flow amounts may be displayed in a manner intended to bring such cash flows to the user's attention. For example, over/under amounts may be in a different font color, bold, highlighted, etc.

Referring further to FIG. 14, a display portion 1126 may be provided that includes links such as link 1128 ("Edit Budget Plan") that permit the user to navigate to other services and applications. For example, should a user select link 1128, a user may be directed to a user interface similar to that provided in FIG. 13 in order to adjust one or more budget cash flow amounts in the user's budget. Additional links 1130 may further be provided in order to provide the user with additional financial and other information. A graphical display 1132 similar to graphical display 1036 shown in FIG. 12 may provide the user with a graphical representation 1134 and associated listing 1136 of spending trends for various transaction categories 1105 over certain time periods of time (e.g., over specific months, averaged over specific months, etc.).

According to an exemplary embodiment, should a user wish to view user interface 1102 without the budget data (e.g., budget cash flow amounts 1122 and over/under cash flow amounts 1124), a user may select an option 1140 ("Hide Budget Plan"), upon which the user may be presented with only actual cash flow amounts, in a manner similar to user interface 1002 shown in FIG. 12. Further, according to another exemplary embodiment, a link 1142 ("Budget Alerts") may be provided. Link 1142 may be configured to direct a user to a separate user interface (see FIG. 15) that enables a user to configure various types of budget alerts based on the user's current budget data and cash flow amounts.

Referring to FIG. 15, a user interface 1150 is shown according to an exemplary embodiment. User interface 1150 ("Set Up/Modify Alerts") may be provided to users to enable users to set up and/or modify budget alerts that may be delivered to users based on certain criteria. Each alert may be defined by a triggering event (e.g., an event that triggers delivery of the alert) and a delivery method (e.g., how, to whom, etc. the alert is delivered). For example, as shown in FIG. 15, a user may establish any or all of three different types of alerts.

In display portion 1152, a user may establish a mid-month progress report. The user is provided with one or more options 1158 that enable the user to elect to receive the alert at the middle of each month and identify one or more appropriate email addresses for delivery. While display portion 1152 illustrates set up for a mid-month progress report, according to various alternative embodiments the time of delivery may vary and may further be configurable by the user. A mid-month budget progress report 1250 is shown in FIG. 17 according to an exemplary embodiment. As shown in FIG. 17, report 1250 may be in the form of an electronic mail message, and may indicate the current spending amount 1252, the monthly goal or budget spending amount 1254, and an over/under budget amount 1256. The information displayed in the budget report is based on the user's data as shown, for example, in FIG. 14. Further, report 1250 may include a link 1258 that directs a user to a user interface page that includes, for example, the information shown in FIG. 14 (e.g., cash flow and budgeting data). Furthermore, additional information 1260 may be provided to the user such that the user is provided with, for example, a telephone number for a customer support service.

In display portion 1154, a user may establish a "75% of Budget" alert. The user is provided with one or more options 1160 that enable the user to elect to receive an alert when the total spending of the user reaches 75% of the monthly budget for spending for the user and identify one or more appropriate email addresses for delivery. While display portion 1154 illustrates a "75% of budget" report, other percentages (e.g., 50%, 90%, 100% etc.) may be used and the percentage may further be configurable by the user.

In display portion 1156, a user may establish an "Over Budget" alert in a similar manner to the other alerts, by electing one or more of options 1162 that enable the user to elect to receive an alert when the total spending of the user exceeds the monthly budget for spending for the user and identify one or more appropriate email addresses for delivery. In some embodiments, the user may be able to define certain other thresholds (e.g., 10% over budget, 20% over budget, etc.) at which to receive an alert. An over budget report 1280 is shown in FIG. 18 according to an exemplary embodiment. As shown in FIG. 18, report 1280 may be in the form of an electronic mail message, and may indicate the current spending amount 1282, the monthly goal or budget spending amount 1284, and an over/under budget amount 1286. Further, report 1280 may include a link 1288 that directs a user to a user interface page that includes, for example, the information shown in FIG. 14 (e.g., cash flow and budgeting data). Furthermore, additional information 1260 may be provided to the user such that the user is provided with, for example, a telephone number for a customer support service.

It should be noted that while options 1158, 1160, and 1162 shown in FIG. 15 illustrate various options for delivering budget alerts via electronic mail delivery, other methods of delivering budget reports to a user may be utilized, including various other electronic messaging types such as text messaging, SMS, etc., audible/graphical alerts, etc.

Figure 16:
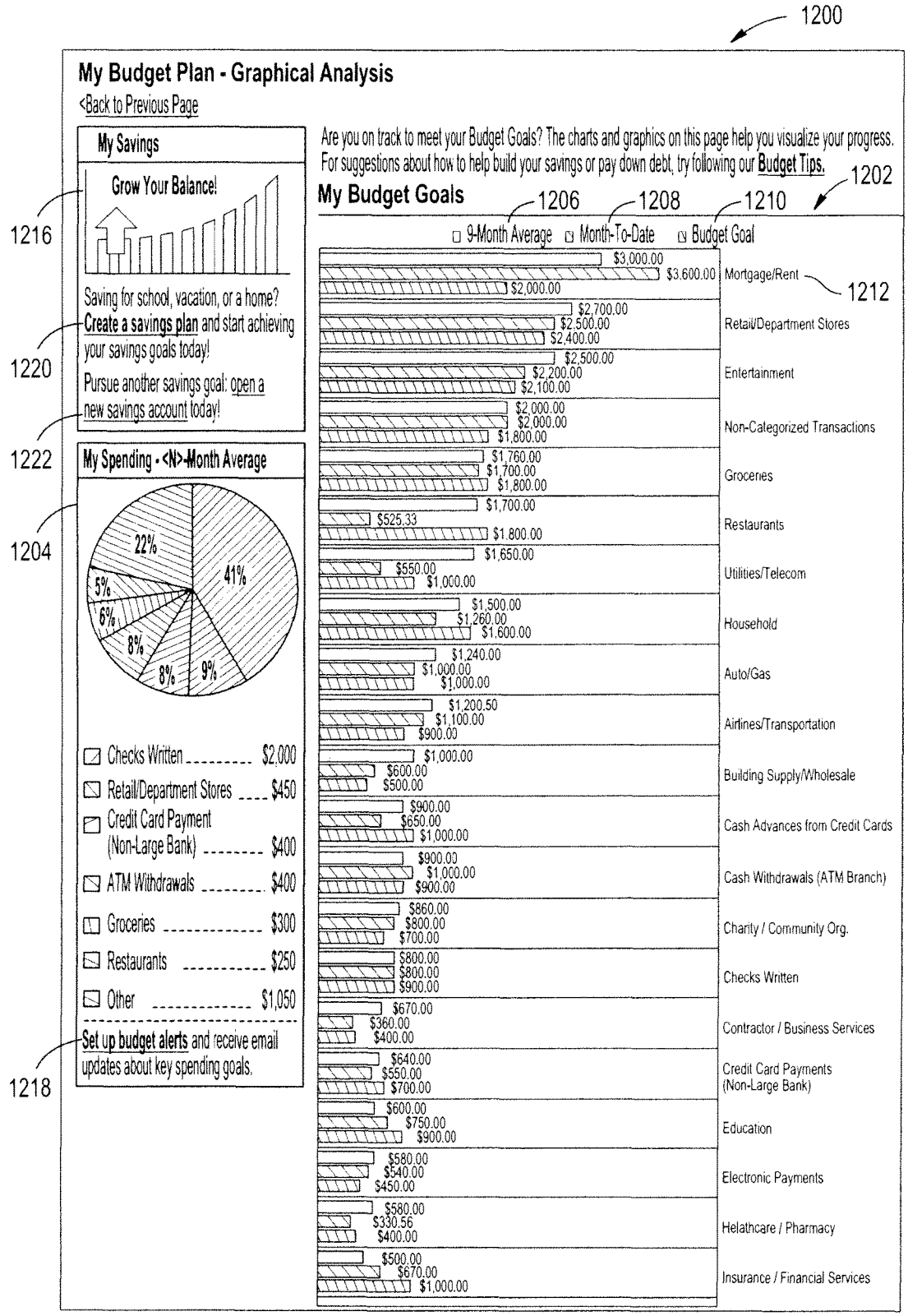

Referring now to FIG. 16, a user interface 1200 is shown according to an exemplary embodiment. User interface 1200 may be linked to one or more other user interfaces illustrated herein (e.g., via hyperlink, etc.) to provide users with the ability to easily obtain a graphical view of their spending and budget data. User interface 1200 may include a graphical analysis of a user's budget plan. For example, user interface 1200 may include a graphical display 1202 (e.g., a bar chart) that lists various spending transaction categories 1212 (e.g., Mortgage/Rent) and for each category, provides a side-by-side comparison of an average cash flow amount 1206 (e.g., a 12-month average, a 6-month average, etc.), a month-to date or current cash flow amount 1208, and a budget cash flow amount 1210.

User interface 1200 may further include a graphical display 1204 that indicates, for example, the relative amounts spent by a user for various transaction categories during a specified time period (e.g., the top-ten categories (by spending amount) over a 12-month period). Further, a link 1218 may direct a user to a user interface such as user interface 1150 shown in FIG. 15 to set up or modify one or more budget alerts for a user. Additional information 1216 and other links 1220, 1222 may further be provided to a user as part of user interface 1200 according to various exemplary embodiments.

Figure 19:
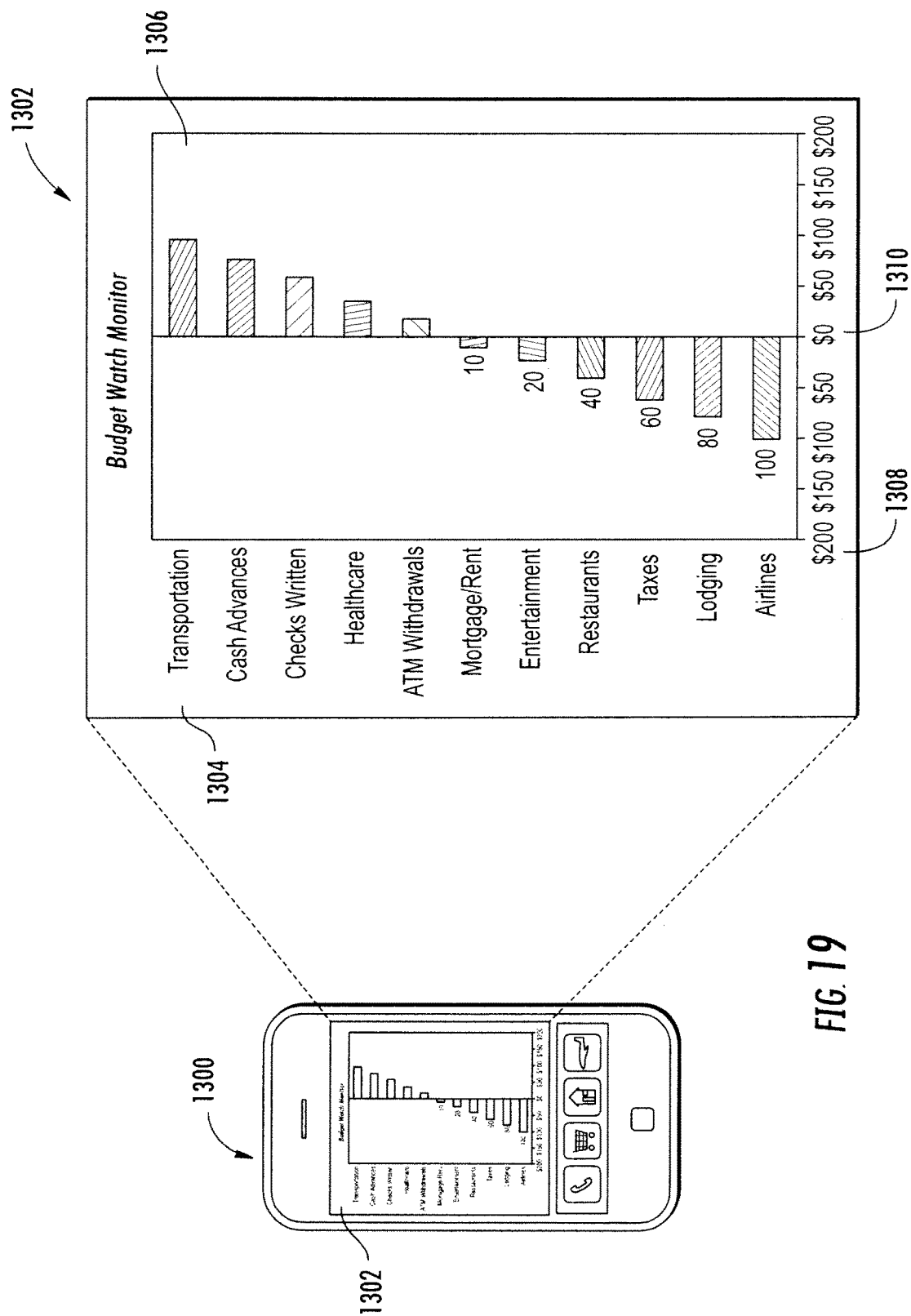
FIG. 19 is a front view of a mobile device according to an exemplary embodiment.

Referring now to FIG. 19, a mobile device 1300 is shown according to an exemplary embodiment, and is configured to display a user interface 1302. Device 1300 may be a mobile or handheld device and may be used as client device 958 as shown in FIG. 11. Providing client device 958 as mobile device 1300 enables system 950 to extend the functionality described herein to the mobile environment, providing users with the information that they need as they travel to and/or between different geographical locations. System 950 (see FIG. 11) may be configured to provide data to mobile device 1300 in the form of, for example, a graphical display, such as that shown in user interface 1302. User interface 1302 may provide a user a graphical depiction 1306 of cash flow amounts 1308 for various categories 1304 relative to a budgeted amount 1310. For example, budgeted amount 1310 is shown as $0 (representing, for example, an over/under amount of $0) in FIG. 19, indicating that variances from amount 1310 represent over/under budget amounts (rather than total spending amounts). Providing such data to users in a mobile environment is intended to provide users with an intuitive, up-to-date representation of their current spending levels relative to their spending goals. For example, should a user in a retail store be contemplating a transaction for a certain amount, a user may access user interface 1302 to determine whether the purchase is within the budget amounts of the user. Additionally, a user may be instantly notified when any budget cash flow amounts are exceeded. The transactional data used by system 950 to provide user interface 1302 (and any of the other user interfaces disclosed herein) may be updated, for example, on a daily basis and be based on a preceding day's transactions, be updated immediately upon receipt of new transaction data, etc.

According to an exemplary embodiment, user interface 1302, and any of the other user interfaces discussed herein, may be updated continuously based on real-time data received by system 950 regarding various financial transactions associated with a user. According to various alternative embodiments, user interfaces may be updated based on predefined time periods (e.g., hourly, daily, weekly, etc.), upon receipt of new transaction data (e.g., upon a retail purchase), according to user-configurable parameters, or by any other suitable method.

Figure 20:
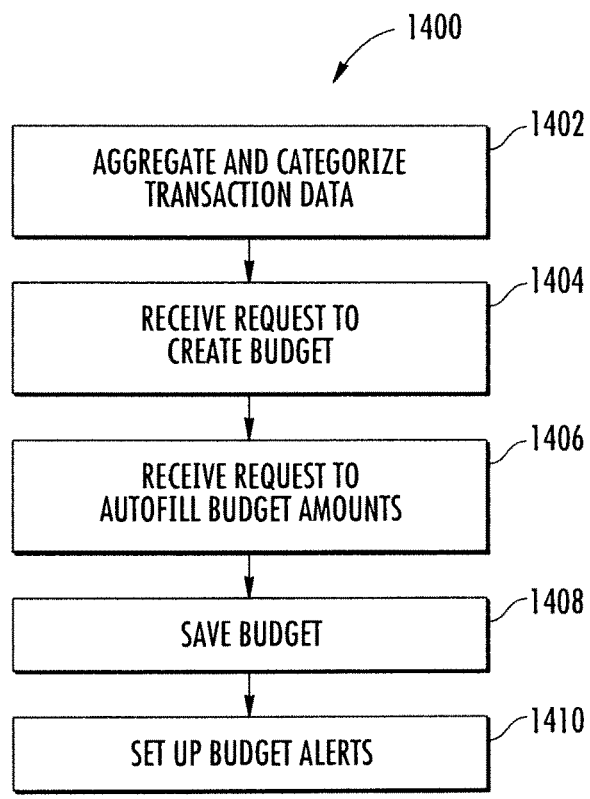
FIG. 20 illustrates a method of generating and providing a spending and budget plan according to an exemplary embodiment.

The various systems, interfaces, and components described herein are intended to facilitate and simplify the user experience in managing financial data and performing various activities, such as viewing spending summaries and creating budget plans. Referring now to FIG. 20, a method 1400 of generating a spending and budget plan or report is illustrated according to an exemplary embodiment. First, system 950 collects financial transaction data and categorizes the transaction data into predefined categories (step 1402). A user interface such as user interface 1002 may be displayed to a user. A request to create a budget plan is then received from the user (step 1404), upon which, a user interface such as user interface 1052 may be displayed to the user. A user may then request to automatically populate the budget cash flow amounts with average cash flow mounts (step 1406), and a user may further modify any of the automatically populated budget amounts. Upon completion of the budget, a user may save the budget (step 1408) and further set up any desire budget alerts (step 1410).

Method 1400 may provide significant advantages over more traditional budgeting tools. For example, method 1400 permits a user viewing a spending summary such as that shown in FIG. 12 to create a budget based on only two inputs from the user. First, the user elects to create a budget, and second, the user elects to automatically populate the budget cash flow amounts. No further input is required from the user to generate a budget plan (although certain users may choose to modify budget amounts, exclude transactions, etc., such activity is not required to set up a budget plan).

Figure 21:
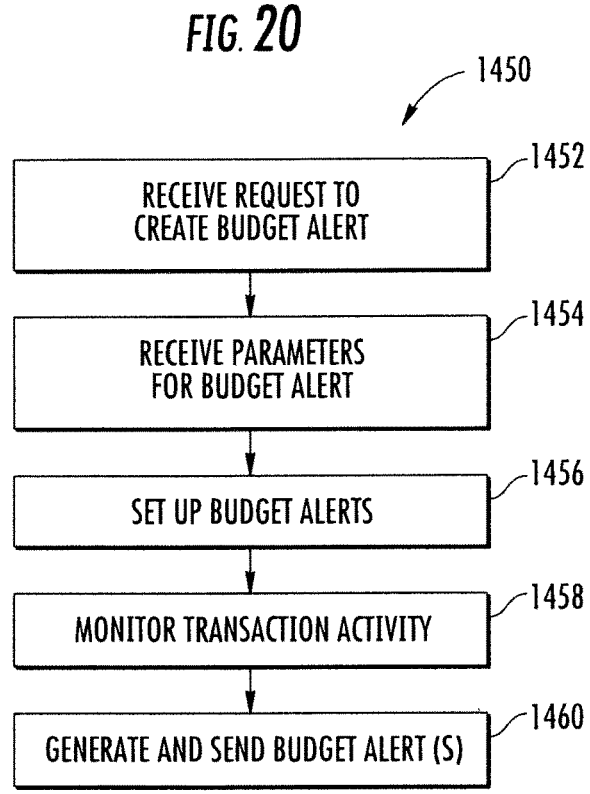
FIG. 21 illustrates a method of generating and providing a budget alert according to an exemplary embodiment.

Referring now to FIG. 21, a method 1450 of creating and providing a budget alert is illustrated according to an exemplary embodiment. First a user elects to create one or more budget alerts, such as by selecting an appropriate link on a budget plan interface (step 1452). Next, the user enters the desire parameters, such as the type of alert (75% of budget, over-budget, mid-month, etc.) and delivery method (email, text message, etc.) (step 1454). System 950 monitors transactional data for the user to track actual versus budget cash flow amounts (step 1456). At the appropriate time, system 950 generates and sends an appropriate budget alert to the user (step 1458).

It is to be understood that embodiments described herein may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the subject matter of this disclosure has been described with reference to specific exemplary embodiments. It will, however, be evident that various modifications and changes may be made thereto without departing from the broader spirit and scope of the disclosure as set forth in the appended Claims. The specification and drawings are, accordingly, to be regarded in an illustrative sense rather than a restrictive sense.

What is claimed is:

1. A data management system comprising:
a storage device provided by a financial institution and comprising a financial management database configured to store financial data for a plurality of financial transactions, the financial data for the plurality of financial transactions being associated with a plurality of different accounts held by a user at the financial institution, each of the plurality of financial transactions being associated with one of a plurality of transaction categories; and
a financial management server provided by the financial institution and coupled to the storage device and configured to provide users with access to an on-line banking area of a website of the financial institution, the financial management server further configured to:
retrieve user information from the financial management database including data access preferences and communication preferences for the user;
receive a request from the user to display aggregate information for the user;
determine that the plurality of different accounts for the user are eligible for real-time processing by the financial management server based on the user information retrieved from the financial management database;
process the plurality of financial transactions in connection with the plurality of different accounts for the user;
select a plurality of selectable links to be displayed to the user, the plurality of links being custom-selected for the user by the financial management server based on a type of financial account for one of the plurality of accounts held by the user at the financial institution, the type of financial account being a payment account, including at least one of a checking account, a credit card account, and a check card account, the plurality of selectable links enabling the user to request generation of a budget; and
provide, via a display device of the user, a display of the plurality of selectable links;
receive, via the display device, a request from the user to generate a budget for the user, the budget including budget cash flow amounts for the plurality of transaction categories;
determine an average cash flow amount for each of the plurality of transaction categories, the average cash flow amount for each of the transaction categories being based on the financial data for financial transactions associated with the transaction category and stored in the storage device provided by the financial institution;
generate the budget report including the budget cash flow amount for each of the plurality of transaction categories, the budget cash flow amount for each transaction category being determined based on the average cash flow amount for the transaction category;
provide, via the display device, the budget report to the user via the on-line banking area of the website of the financial institution; and
receive, via the display device, a user input modifying one of the budget cash flow amounts and update the budget report based on the user input;
wherein the budget report is generated with the average cash flow amounts for the transaction categories and provided to the user, on the display device of the user, automatically in response to receiving the request from the user to generate the budget, such that no further budget criteria inputs are received from the user after receiving the request and prior to providing the user with the budget report; and
wherein the budget report identifies each of the plurality of transaction categories, and adjacent each of the transaction categories, further includes:
a bar chart of a historical cash flow amount;
a bar chart of a budget cash flow amount; and
a bar chart of a comparison of the budget cash flow amount relative to a current cash flow amount for the transaction category.

2. The system of claim 1, wherein the average cash flow amount for each of the plurality of transaction categories is determined over a predetermined period of time.

3. The system of claim 2, wherein the predetermined period of time is configurable by the user.

4. The system of claim 1, wherein the server is further configured to
receive a second input from the user identifying at least one financial transaction to be excluded in determining the average cash flow amount for at least one of the plurality of transaction categories; and determine the average cash flow amount for the at least one of the plurality of transaction categories based on excluding the identified financial transaction.

5. The system of claim 1, wherein the server is further configured to generate a graphical display of cash flow amounts for the user, the graphical display being provided as part of the budget report.

6. The system of claim 1, wherein the server is further configured to provide an alert to the user based on user cash flow amounts and budget cash flow amounts, wherein the alert is provided based on user-configurable parameters including a delivery method for the alert and a delivery time for the alert, and wherein the delivery time for the alert is based on one of a time period and a threshold cash flow amount.

7. The system of claim 1, wherein the server is further configured to provide the budget report to a handheld computing device via a wireless communication link.

8. A method performed by one or more processors of a financial management computer system provided by a financial institution, the method comprising:

managing financial accounts of a user by a computer server of the financial management computer system, including processing a plurality of financial transactions for the financial accounts, the financial accounts comprising at least a savings account and a checking account held by the user at the financial institution;

providing, by the computer server of the financial management computer system, user access to an on-line banking area of a website of the financial institution;

storing, by the computer server of the financial management computer system, financial data for the plurality of financial transactions in a storage device provided by the financial institution, the storage device including a financial management database, each of the plurality of financial transactions being associated with one of a plurality of transaction categories;

retrieving user information from the financial management database including data access preferences and communication preferences for the user;

receiving a request from the user to display aggregate information for the user;

determining that the plurality of different accounts for the user are eligible for real-time processing by the financial management server based on the user information retrieved from the financial management database;

selecting, by the computer server of the financial management computer system, a plurality of selectable links to be displayed to the user, the plurality of links being custom-selected for the user by the server based on a type of financial account for one of the plurality of accounts held by the user at the financial institution, the type of financial account being a payment account, including at least one of a checking account, a credit card account, and a check card account, the plurality of selectable links enabling the user to request generation of a budget report;

providing, by the computer server of the financial management computer system, a display of the plurality of selectable links to a display device of the user;

receiving, by the computer server of the financial management computer system, a request from a user via the display device to generate a budget for the user, the budget including budget cash flow amounts for the plurality of transaction categories;

determining, by the computer server of the financial management computer system, an average cash flow amount for each of the plurality of transaction categories, the average cash flow amount for each of the transaction categories being based on the financial data for financial transactions associated with the transaction category;

generating, by the computer server of the financial management computer system, the budget report including the budget cash flow amount for each of the plurality of transaction categories, the budget cash flow amount for each transaction category being automatically populated with the average cash flow amount for the transaction category;

providing, by the computer server of the financial management computer system and via the display device, the budget report to the user via the on-line banking area of the website of the financial institution;

receiving, by the computer server of the financial management computer system and via the display device, an input from the user identifying which of the plurality of accounts are to be included in the budget report and updating the budget report to reflect the identified accounts; and receiving, by the computer server of the financial management computer system and via the display device, an additional user input modifying one of the budget cash flow amounts and updating the budget report based on the user input;

wherein the budget report is generated with the average cash flow amounts for the transaction categories and provided to the user, on the display device of the user, automatically in response to receiving the request from the user to generate the budget, such that no further budget criteria inputs are received from the user after receiving the request and prior to providing the user with the budget report; and wherein the budget report identifies each of the plurality of transaction categories, and adjacent each of the transaction categories, further includes:

a bar chart of a historical cash flow amount;

a bar chart of a budget cash flow amount; and a bar chart of a comparison of the budget cash flow amount relative to a current cash flow amount for the transaction category.

9. The method of claim 8, further comprising:

retrieving the financial data for the plurality of financial transactions from the storage device.

10. The method of claim 8, further comprising:

determining the average cash flow amount for each of the plurality of transaction categories over a predetermined period of time.

11. The method of claim 10, further comprising:

receiving a user input identifying the predetermined period of time.

12. The method of claim 8, further comprising:

receiving a second input from the user identifying at least one financial transaction to be excluded in determining the average cash flow amount for at least one of the plurality of transaction categories; and determining the average cash flow amount for the at least one of the plurality of transaction categories based on excluding the identified financial transaction.

13. The method of claim 8, further comprising:

providing an alert to the user based on user cash flow amounts and budget cash flow amounts, wherein the alert is provided based on user-configurable parameters including a delivery method for the alert and a delivery time for the alert, and wherein the delivery time for the alert is based on one of a time period and a threshold cash flow amount.

14. The method of claim 13, further comprising:
providing the budget report to a handheld computing device via a wireless communication link.

15. A method of providing data to a mobile device, the method being performed by one or more processors of a financial management computer system provided by a financial institution and comprising:
managing, by a computer server of the financial management computer system, financial accounts of a user, including processing a plurality of financial transactions for the financial accounts;
providing, by the computer server of the financial management computer system, user access to an on-line banking area of a website of the financial institution via a mobile computing device;
storing, by the computer server of the financial management computer system, cash flow data in a storage device accessible via the mobile computing device and provided by the financial institution, the cash flow data being associated with the plurality of financial transactions and including at least credit card transactions and checking account transactions, and the cash flow data further being associated with the plurality of financial accounts held by the user at the financial institution, including at least a credit card account and a checking account;
retrieving user information from the storage device including data access preferences and communication preferences for the user;
receiving a request from the user to display aggregate information for the user;
determining that the plurality of different accounts for the user are eligible for real-time processing by the computer server based on the user information retrieved from the storage device;
retrieving, by the computer server of the financial management computer system, the cash flow data from the storage device;
categorizing, by the computer server of the financial management computer system, the plurality of financial transactions into a plurality of transaction categories, the plurality of financial transactions being categorized based on at least one of a vendor category and a payment method;
selecting, by the computer server of the financial management computer system, a plurality of selectable links to be displayed to the user, the plurality of links being custom-selected for the user by the server based on a type of financial account for one of the plurality of accounts held by the user at the financial institution, the type of financial account being a payment account, including at least one of a checking account, a credit card account, and a check card account, the plurality of selectable links enabling the user to request generation of a budget report; and
providing, by the computer server of the financial management computer system, a display of the plurality of selectable links to the mobile computing device;
receiving, by the computer server of the financial management computer system, a first input from the mobile computing device of the user identifying at least one transaction of the plurality of transaction categories that is to be excluded from the calculation of budget cash flow amounts;
for each transaction category, determining, by the computer server of the financial management computer system, the budget cash flow amount based on an average cash flow amount for the transaction category, wherein the average cash flow amount is based on the cash flow data for the financial transactions categorized within the transaction category over a time period and stored in the storage device provided by the financial institution, wherein the time period is configurable by the user, and wherein the average cash flow amount is based on excluding the transaction identified by the user;
receiving, by the computer server of the financial management computer system, a second input from the mobile computing device of the user modifying at least one of the budget cash flow amounts;
updating, by the computer server of the financial management computer system, the budget cash flow amounts to reflect the second input;
providing, by the computer server of the financial management computer system, the budget report to the mobile computing device, the budget report including a graphical indication of an actual cash flow amount relative to the budget cash flow amount for at least a portion of the plurality of transaction categories, the budget report further including an amount by which the actual cash flow amount is over or under the budget cash flow amount for the portion of the plurality of transaction categories, the budget report being provided to the mobile computing device in accordance with user-configurable delivery parameters; and
receiving, by the computer server of the financial management computer system, a third input from the mobile computing device of the user identifying which of the plurality of accounts are to be included in the budget report and updating the budget report to reflect the identified accounts;
wherein the budget report is generated with the average cash flow amounts for the transaction categories and provided to the user, on the mobile computing device, automatically in response to receiving a request from the user to generate the budget, such that no further budget criteria inputs are received from the user after receiving the request and prior to providing the user with the budget report; and
wherein the budget report identifies each of the plurality of transaction categories, and adjacent each of the transaction categories, further includes:
a bar chart of a historical cash flow amount;
a bar chart of a budget cash flow amount; and
a bar chart of a comparison of the budget cash flow amount relative to a current cash flow amount for the transaction category.

16. The method of claim 15, wherein the user-configurable delivery parameters include a delivery method for the alert and a delivery time for the alert, and wherein the delivery time for the alert is based on one of a time period and a threshold cash flow amount.

17. The method of claim 15, further comprising:
receiving a request via the mobile device for the budget report; and
providing the budget report to the mobile device in response to the request.

18. The method of claim 15, further comprising:
receiving a fourth input via the mobile device to sort the transaction categories in order by one of an alphabetical order and an order determined by the difference of the actual cash flow amount and the budget cash flow amount for each category; and
displaying the budget report with the transaction categories ordered in accordance with the fourth input.

19. The method of claim 15, further comprising:
updating the cash flow data stored in the storage device at least on a daily basis based on new cash flow data associated with the plurality of financial accounts.

20. The system of claim 1, wherein the server is further configured to provide a first alert to the user when current spending for at least one transaction category of the user reaches a predetermined percentage of the budget cash flow amount for the transaction category, and provide a second alert to the user when the current spending exceeds the budget cash flow amount for the transaction category.

* * * * *